(12) United States Patent
Ishikura et al.

(10) Patent No.: US 11,044,781 B2
(45) Date of Patent: Jun. 22, 2021

(54) BASE STATION DEVICE, COMMUNICATION SYSTEM, TERMINAL DEVICE, COMMUNICATION METHOD, AND PROGRAM

(71) Applicant: SHARP KABUSHIKI KAISHA, Sakai (JP)

(72) Inventors: Katsutoshi Ishikura, Sakai (JP); Yuhsuke Takagi, Sakai (JP); Atsushi Yamazaki, Sakai (JP); Hideyuki Nakanishi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/285,754

(22) Filed: Feb. 26, 2019

(65) Prior Publication Data
US 2019/0289662 A1 Sep. 19, 2019

(30) Foreign Application Priority Data
Mar. 19, 2018 (JP) .............................. JP2018-051562

(51) Int. Cl.
*H04W 76/28* (2018.01)
*H04W 72/04* (2009.01)

(52) U.S. Cl.
CPC ....... *H04W 76/28* (2018.02); *H04W 72/0446* (2013.01)

(58) Field of Classification Search
CPC ......... H04W 52/0216; H04W 52/0229; H04W 56/00; H04W 72/0406; H04W 72/0446; H04W 76/28
See application file for complete search history.

(56) References Cited

U.S. PATENT DOCUMENTS

| 2010/0317345 | A1 | 12/2010 | Futaki et al. | |
|---|---|---|---|---|
| 2013/0003629 | A1* | 1/2013 | Jeong | H04W 52/0216 370/311 |
| 2013/0148521 | A1* | 6/2013 | Sammour | H04W 72/0406 370/252 |
| 2015/0173122 | A1* | 6/2015 | Schliwa-Bertling | H04W 56/00 370/311 |

(Continued)

FOREIGN PATENT DOCUMENTS

JP 6195964 B2 5/2013

*Primary Examiner* — Michael Thier
*Assistant Examiner* — Prince A Mensah
(74) *Attorney, Agent, or Firm* — ScienBiziP, P.C.

(57) ABSTRACT

A base station device includes: a communication unit configured to wirelessly communicate with a terminal device; a storage unit; and a control unit. The control unit is configured to refer to discontinuous reception information, stored in the storage unit, which indicates a plurality of discontinuous reception settings, transmit transmission data to the terminal device in at least a portion of a first reception period of time corresponding to at least one of the discontinuous reception settings, and transmit the transmission data to the terminal device in at least a portion of a second reception period of time corresponding to at least another one of the discontinuous reception settings in a case that it is determined that response information with respect to the transmitted transmission data is not received.

13 Claims, 17 Drawing Sheets

(56) References Cited

U.S. PATENT DOCUMENTS

2016/0057804 A1* 2/2016 Karlsen ............ H04W 52/0219
455/422.1
2016/0073284 A1* 3/2016 Qian ................. H04W 52/0229
370/241

* cited by examiner

| TERMINAL TYPE | CANDIDATE DRX SETTING |
|---|---|
| MOBILE | SHORT PERIOD DRX |
|  | INTERMEDIATE PERIOD DRX |
|  | LONG PERIOD DRX |
| FIXED/REGULAR POWER SUPPLY CONNECTION | SHORT PERIOD DRX |
|  | REGULAR ON |
| ULTRA-LOW DELAY | REGULAR ON |
| IoT | LONG PERIOD DRX |
|  | ULTRA-LONG PERIOD DRX |

BASE STATION DEVICE, COMMUNICATION SYSTEM, TERMINAL DEVICE, COMMUNICATION METHOD, AND PROGRAM

BACKGROUND OF THE INVENTION

Field of the Invention

The present invention relates to a base station device, a communication system, a terminal device, a communication method, and a program.

Description of Related Art

Discontinuous reception (DRX) has previously been proposed as a method of reducing power consumption of a terminal device relating to wireless communication. In DRX, a terminal device that is in a standby state and not performing communication discontinuously stands by for various types of data transmitted from a base station device. In other words, in DRX, data standby is performed in a reception period of time which is a portion of a period of time for each predetermined period, and data standby is not performed in a non-reception period of time which is the remaining period of time.

In a communication system which is composed of a base station device and a terminal device, the base station device determines a DRX setting for each terminal device within a cell managed by the base station device, and the terminal device executes discontinuous reception in accordance with the DRX setting determined by the base station. For example, Japanese Patent No. 5195964 discloses a wireless communication system in which a base station device determines a DRX cycle with reference to a transmission and reception status of data in each mobile station device, and notifies the mobile station device of the result.

Patent Document

[Patent Document 1] Japanese Patent No. 5195964

SUMMARY OF THE INVENTION

On the other hand, optimum DRX settings are diversified in accordance with the function or use aspect of a terminal device. For example, in $5^{th}$ generation wireless systems (5G), the introduction of an extended discontinuous reception technique has been examined. However, in a case that processes related to a DRX setting composed of a DRX period or the like are performed for each terminal device, an increasing number of terminal devices managed by a base station device give rise to an increase in a load related to those processes. On the other hand, the selection of a DRX setting having a high degree of freedom is expected in a terminal device.

The present invention was contrived in view of the above point, and an object thereof is to provide a base station device, a communication system, a terminal device, a communication method, and a program that make it possible to suppress an increase in a load in a base station device while a discontinuous reception setting having a high degree of freedom in a terminal device can be selected.

(1) The present invention is made to solve the above-described problem, one aspect of the present invention is a base station device including: a communication unit configured to wirelessly communicate with a terminal device; a storage unit; and a control unit, wherein the control unit is configured to refer to discontinuous reception information, stored in the storage unit, which indicates a plurality of discontinuous reception settings, transmit transmission data to the terminal device in at least a portion of a first reception period of time corresponding to at least one of the discontinuous reception settings, and transmit the transmission data to the terminal device in at least a portion of a second reception period of time corresponding to at least another one of the discontinuous reception settings in a case that it is determined that response information with respect to the transmitted transmission data is not received.

(2) In the base station device according to one aspect of the present invention, the control unit may be configured to determine that response information with respect to the transmitted transmission data is not received in a case that response information with respect to the transmission data is not received at a reception slot after a predetermined slot from a transmission slot at which the transmission data is transmitted.

(3) In the base station device according to one aspect of the present invention, the control unit may be configured to determine that response information with respect to the transmitted transmission data is not received in a case that response information with respect to the transmission data is not received at a common slot with respect to a transmission slot at which the transmission data is transmitted.

(4) In the base station device according to one aspect of the present invention, the transmission data may indication information indicating presence of transmission data which is transmitted to the terminal device after a predetermined slot from a transmission slot at which the transmission data is transmitted, and the response information may be confirmation information for the indication information.

(5) In the base station device according to one aspect of the present invention, the discontinuous reception setting may include a discontinuous reception period and a reception period of time within the discontinuous reception period.

(6) In the base station device according to one aspect of the present invention, the discontinuous reception information may indicate a maximum value among discontinuous reception periods indicated by the plurality of discontinuous reception settings.

(7) In the base station device according to one aspect of the present invention, the control unit may be configured to refer to association of a terminal type with a discontinuous reception setting which is stored in the storage unit, select a discontinuous reception setting corresponding to a terminal type reported from the terminal device, and transmit the transmission data to the terminal device in at least a portion of a reception period of time corresponding to the selected discontinuous reception setting.

(8) One aspect of a communication system includes: a base station device; and a terminal device, wherein the base station device includes: a communication unit, a storage unit, and a control unit, and wherein the control unit is configured to refer to discontinuous reception information, stored in the storage unit, which indicates a plurality of discontinuous reception settings, transmit transmission data to the terminal device in at least a portion of a first reception period of time corresponding to at least one of the discontinuous reception settings, and transmit the transmission data to the terminal device in at least a portion of a second reception period of time corresponding to at least another one of the discontinuous reception settings in a case that it is determined that response information with respect to the transmitted transmission data is not received.

(9) One aspect of the present invention is a communication system including: a base station device; and a terminal device, wherein the base station device includes: a communication unit, a storage unit, and a control unit, wherein the control unit is configured to notify the terminal device of discontinuous reception information, stored in the storage unit, which indicates a plurality of discontinuous reception settings through the communication unit, wherein the terminal device includes: a terminal communication unit, a terminal storage unit, and a terminal control unit, and wherein the terminal control unit is configured to store discontinuous reception information received from the base station device through the terminal communication unit in the terminal storage unit, select one of discontinuous reception settings indicated by the discontinuous reception information stored in the terminal storage unit, discontinuously receive transmission data from the base station device in a reception period of time corresponding to the selected discontinuous reception setting, and transmit response information with respect to the transmission data to the base station device in a case that the transmission data destined for a host device is received.

(10) One aspect of the present invention is a terminal device including: a communication unit configured to wirelessly communicate with a base station device; a storage unit; and a control unit, wherein the control unit is configured to select one discontinuous reception setting from among a plurality of discontinuous reception settings indicated by discontinuous reception information stored in the storage unit, discontinuously receive transmission data from the base station device in a reception period of time corresponding to the selected discontinuous reception setting, and transmit response information with respect to the transmission data to the base station device in a case that the transmission data destined for a host device is received.

(11) In the terminal device according to one aspect of the present invention, the control unit may be configured to store discontinuous reception information received from the base station device in the storage unit.

(12) One aspect of the present invention is a communication method of a base station device including a communication unit configured to wirelessly communicate with a terminal device and a storage unit, wherein the base station device is configured to refer to discontinuous reception information, stored in the storage unit, which indicates a plurality of discontinuous reception settings, and wherein the communication method includes: transmitting transmission data to the terminal device in at least a portion of a first reception period of time corresponding to at least one of the discontinuous reception settings; and transmitting the transmission data to the terminal device in at least a portion of a second reception period of time corresponding to at least another one of the discontinuous reception settings in a case that it is determined that response information with respect to the transmitted transmission data is not received.

(13) One aspect of the present invention is a non-transitory computer readable recording medium storing a program for causing a computer of a base station device including a communication unit configured to wirelessly communicate with a terminal device and a storage unit to: refer to discontinuous reception information, stored in the storage unit, which indicates a plurality of discontinuous reception settings; transmit transmission data to the terminal device in at least a portion of a first reception period of time corresponding to at least one of the discontinuous reception settings; and transmit the transmission data to the terminal device in at least a portion of a second reception period of time corresponding to at least another one of the discontinuous reception settings in a case that it is determined that response information with respect to the transmitted transmission data is not received.

According to the present invention, it is possible to suppress an increase in a load in a base station device while a discontinuous reception setting having a high degree of freedom in a terminal device can be selected.

DETAILED DESCRIPTION OF THE INVENTION

First Embodiment

Hereinafter, a first embodiment of the present invention will be described with reference to the accompanying drawings.

First, a communication system S1 that is an example of a communication system according to the present embodiment will be described.

Figure 1:
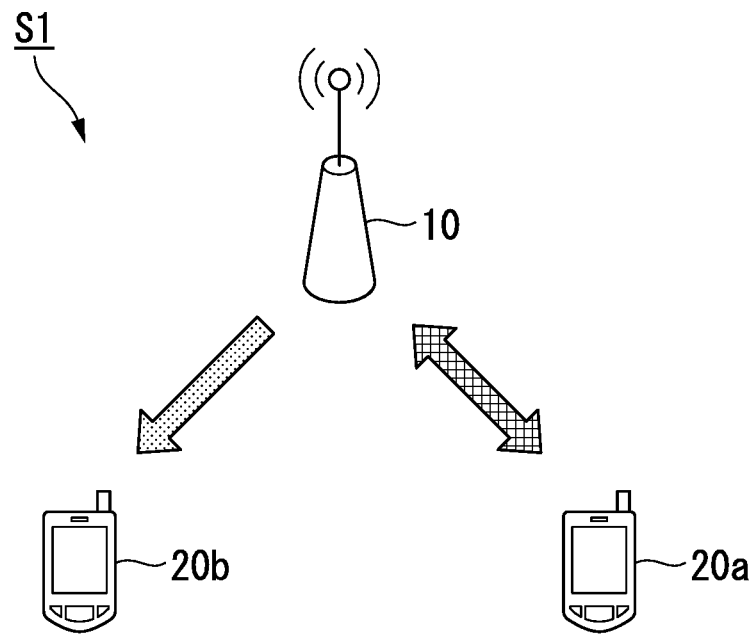
FIG. 1 is a conceptual diagram illustrating an example of a communication system according to a first embodiment.

FIG. 1 is a conceptual diagram illustrating an example of the communication system S1 according to the present embodiment.

The communication system S1 is configured to include a base station device 10 and one or a plurality of terminal devices 20. In the example shown in FIG. 1, the number of base station devices 10 is one. The number of terminal devices 20 capable of communicating with the base station device 10 is two. The two terminal devices 20 are called terminal devices 20a and 20b to be distinguished from each other.

The number of base station devices 10 may be plural. The number of terminal devices 20 with which individual base station devices 10 are capable of communicating may also be zero, one, or three or more.

The base station device 10 is wirelessly communicably connected to the terminal device 20 within the coverage of a host device, and transmits and receives various types of data. The coverage refers to a range in which radio waves from the base station device 10 arrive with power equal to or greater than predetermined reception power. The coverage is also called a coverage area.

The base station device 10 notifies the terminal device 20 of discontinuous reception information (hereinafter, called "DRX information") indicating candidates of a plurality of discontinuous reception settings (hereinafter, called "candidate DRXs"). In a case that the base station device 10 acquires transmission data destined for the terminal device 20, the base station device attempts to transmit the transmission data to the terminal device 20 in at least a portion of a reception period of time indicated by each of the plurality of candidate DRXs. In a case that the base station device 10 receives response information with respect to the transmitted transmission data, the base station device continues to transmit transmission data which is not yet transmitted to the terminal device 20.

The terminal device 20 is wirelessly communicably connected to the base station device 10 in the coverage of the base station device 10, and transmits and receives various types of data. The terminal device 20 acquires operation status information indicating the operation status of a host device, and selects one candidate DRX as DRX setting information used in the execution of DRX based on the operation status information acquired from a plurality of candidate DRX settings indicated by DRX information received from the base station device 10. The terminal device 20 executes DRX using the selected DRX setting information. The terminal device 20 receives transmission data (control data) from the base station device 10 in a reception period of time indicated by the selected DRX setting information, and transmits response information with respect to the data to the base station device 10 in a case where control information indicating transmission data destined for a host device is included. In the present embodiment, the terminal device 20 may not notify the base station device 10 explicitly of the selected DRX setting information. The terminal device 20 stops the execution of DRX upon receiving the transmission data destined for a host device, and continues to receive the transmission data.

Operation states in which the terminal device 20 starts the execution of DRX include mainly (1) a communication connection state (connected mode, also called radio resource control (RRC) connected) and (2) a standby state (idle mode, also called RRC idle).

DRX executed in the state of (1) is also called connected DRX (C-DRX). The terminal device 20a transmits the DRX setting information to the terminal device 20a with the information included in various communication parameters such as RRC setting information, for example, during the start of communication connection, that is, during transition from the standby state to the communication connection state. These communication parameters are transmitted using, for example, a physical downlink shared channel (PDSCH). Thereafter, the base station device 10 may transmit DRX information to the terminal device 20a with this information included in predetermined control information (for example, downlink control information (DCI) format transmitted through a physical downlink control channel (PDCCH). The terminal device 20a starts clocking using a timer (hereinafter, called a "DRX timer") that clocks a time for which the active state of communication is maintained, for example, in a case that there is no data communication, that is, in a case that there is no transmission data relating to transmission and reception, and starts the state of (1) after the elapse of a predetermined period of time (hereinafter, called a "DRX transition time") until the timer expires. The terminal device 20a can receive the DRX information and other information in a reception period of time indicated by the set DRX setting. A DRX period relating to C-DRX is also called a "C-DRX period".

DRX executed in the state of (2) is also called I-DRX. The terminal device 20 starts clocking using a timer (hereinafter, called a "state transition timer") that manages the transition of an operation state, for example, in a case that there is no transmission data relating to transmission and reception, and starts the state of (2) after the elapse of a predetermined time (hereinafter, called a "state transition time") until the timer expires. The state transition time is longer than the DRX transition time.

In the present embodiment, the base station device 10 transmits the DRX information with this information included in predetermined broadcast control information (for example, a system information block (SIB) transmitted through a broadcast control channel (BCCH)). The terminal device 20b can receive the information with respect to the terminal device 20b which is in the standby state. In I-DRX, the terminal device 20b stands by for paging (calling) information which is transmitted from the base station device 10 in the DRX period. A DRX period relating to the I-DRX is also called an "I-DRX period" or a "paging period".

The following description mainly concerns the case of the C-DRX unless otherwise stated.

(Base Station Device)

Next, a configuration example of the base station device 10 according to the present embodiment will be described.

Figure 2:
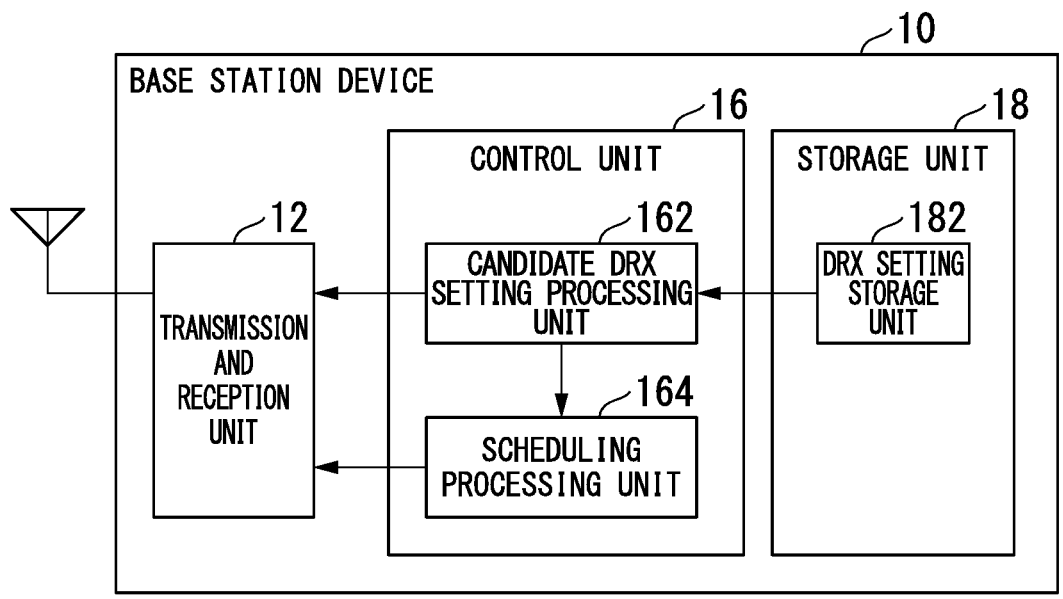
FIG. 2 is a block diagram illustrating a configuration example of a base station device according to the first embodiment.

FIG. 2 is a block diagram illustrating a configuration example of the base station device 10 according to the present embodiment.

The base station device 10 is configured to include a transmission and reception unit 12, a control unit 16, and a storage unit 18.

The transmission and reception unit 12 wirelessly transmits and receives various types of data to and from the terminal device 20 which is located within the coverage of a host device. The transmission and reception unit 12 generates a reception signal of a base frequency band by down-converting a reception signal of a radio frequency band which is transmitted through radio waves from the terminal device 20, and outputs the generated reception signal to the control unit 16. The transmission and reception unit 12 generates a transmission signal of a radio frequency band by up-converting a transmission signal of a base frequency band which is input from the control unit 16, and sends out the generated signal through radio waves.

The transmission and reception unit 12 is configured to include, for example, a wireless communication interface.

The control unit 16 performs various types of control relating to communication of the base station device 10. The control unit 16 performs, for example, a process for connection with the terminal device 20, a process for transmitting reception data from the terminal device 20 to a destination device serving as a communication partner, a process for transmitting transmission data which is transmitted from the destination device to the terminal device 20, control of the carrier frequency of the transmission and reception unit 12, and the like. In addition, the control unit 16 may be connected to a core network (not shown), and receive paging information from the core network. In a case that the control unit 16 receives a preamble as response information with respect to the paging information from the terminal device 20, the control unit establishes connection with a destination device through the core network.

The control unit 16 is configured to include a candidate DRX setting processing unit 162 and a scheduling processing unit 164.

The candidate DRX setting processing unit 162 selects a plurality of candidate DRX settings from a large number of DRX settings which are stored in advance in a DRX setting storage unit 182. The candidate DRX setting processing unit 162 may select a candidate DRX setting in accordance with a predetermined reference, and may select a candidate DRX setting in accordance with indicated a user's operation. The candidate DRX setting processing unit 162 reads out a plurality of selected candidate DRX settings from the DRX setting storage unit 182. The candidate DRX setting processing unit 162 transmits a plurality of read-out candidate DRX settings to the terminal device 20 through the transmission and reception unit 12. The candidate DRX setting processing unit 162 transmits candidate DRX settings to the terminal device 20 with the setting included in communication parameters, for example, during the start of communication connection with the terminal device 20. During the transmission thereof to the terminal device 20, the candidate DRX setting processing unit 162 transmits a plurality of read-out candidate DRX settings to, for example, one or both of a broadcast control channel and a control channel. Meanwhile, in a case where the broadcast control channel is used, at a point in time in a case that a candidate DRX setting is transmitted, the terminal device 20 does not necessarily receive the transmitted candidate DRX setting. Consequently, in transmission using the broadcast control channel, the candidate DRX setting processing unit 162 may repeat the transmission of a candidate DRX setting selected for each predetermined period of time.

Meanwhile, the candidate DRX setting processing unit 162 may read out all of a plurality of DRX settings which are stored in the DRX setting storage unit 182 in advance, and transmit the read-out settings, as they are, to the terminal device 20 through the transmission and reception unit 12 without selecting a specific candidate DRX setting from a plurality of read-out candidate DRX settings.

The scheduling processing unit 164 schedules communication with each of the terminal devices 20 which are located within the coverage of a host device. The scheduling processing unit 164 determines scheduling information in accordance with the state of connection with each of the terminal devices 20, the capability of communication therewith, or the like. The scheduling information includes parameters for transmitting and receiving data such as the arrangement of data (radio resources), a modulation scheme, and a code rate. The scheduling processing unit 164 allocates radio resources to the terminal device 20 which is in a communication connection state, and generates scheduling information indicating the allocated radio resources. The radio resources are a designated by a frequency, a slot or the like. A slot is a period of time serving as a unit of scheduling. One slot is, for example, 0.125, 0.25, 0.5, 1 ms, or the like. In a case that transmission data is transmitted to the terminal device 20, the scheduling processing unit 164 modulates the transmission data in accordance with scheduling information determined with respect to the terminal device 20, and arranges the modulated data in indicated radio resources.

In a case that user data destined for the terminal device 20 is acquired, the scheduling processing unit 164 transmits transmission data including the acquired user data to the terminal device 20 through the transmission and reception unit 12 at least at a point in time of the start of a reception period of time indicated by each of the plurality of transmitted candidate DRX settings. In other words, the scheduling processing unit 164 may also duplicately transmit transmission data between the plurality of candidate DRX settings at least at the head of a reception period of time indicated by each reported candidate DRX setting. In the following description, the transmission of the same transmission data in a reception period of time indicated by each of a plurality of DRX settings may be called "duplicate transmission".

Regarding the terminal device 20 that executes C-DRX, the transmission data corresponds to, for example, scheduling information and user data. The response information corresponds to, for example, hybrid automatic repeat request (HARQ) information indicating acknowledgement (ACK). The HARQ information is also called ACK/NACK (negative acknowledgement) information.

In a case where the scheduling processing unit 164 has received response information with respect to the transmitted transmission data from the terminal device 20 through the transmission and reception unit 12, the scheduling processing unit 164 starts the transmission of transmission data which is not yet transmitted to the terminal device 20, and continues the transmission. In a case where the response information is received, the terminal device 20 can receive transmission data This is because it is estimated that DRX is released to start regular reception, or the regular reception is already performed.

Meanwhile, in a case where the scheduling processing unit 164 receives no response information (for example, ACK/NACK information, advance indication acknowledgement information, or a preamble signal) with respect to transmission data transmitted in a reception period of time relating to any of the candidate DRX settings, the scheduling processing unit may repeat (retransmit) duplicate transmission.

In a case where the number of repetitions of the duplicate transmission is equal to or greater than a threshold of a predetermined number of repetitions, the scheduling processing unit 164 may stop the duplicate transmission.

The storage unit 18 stores various types of data used in processes which are executed by the base station device 10 and various types of data acquired in the processes. The storage unit 18 stores, for example, a program for controlling the processes executed by the base station device 10 or data transmitted and received to and from the terminal device 20 or the core network. The storage unit 18 is configured to include a recording medium such as a random access memory (RAM) or an electrically erasable programmable read-only memory (EEPROM) as hardware. The storage unit 18 is configured to include the DRX setting storage unit 182 as a functional configuration.

The DRX setting storage unit 182 stores a plurality of different candidate DRX settings in advance. The candidate DRX setting is setting information indicating a DRX period and a reception period of time. The DRX period is a period of time which is a unit of repetition of a reception period of time in which reception is performed and a non-reception period of time in which reception is not performed. The reception period of time is a period of time in which reception is performed within individual DRX periods. The reception period of time is represented by, for example, an offset and duration. The offset indicates a start time of a reception period of time based on the time of start of one DRX period. Therefore, the sum of an offset and duration is equivalent to an end time of a reception period of time. The DRX setting storage unit 182 may store a candidate DRX setting in advance before the start of use of the base station device 10. In addition, the DRX setting storage unit 182 may store a candidate DRX setting acquired from the core network by the control unit 16.

(Terminal Device)

Next, a configuration example of the terminal device 20 according to the present embodiment will be described.

Figure 3:
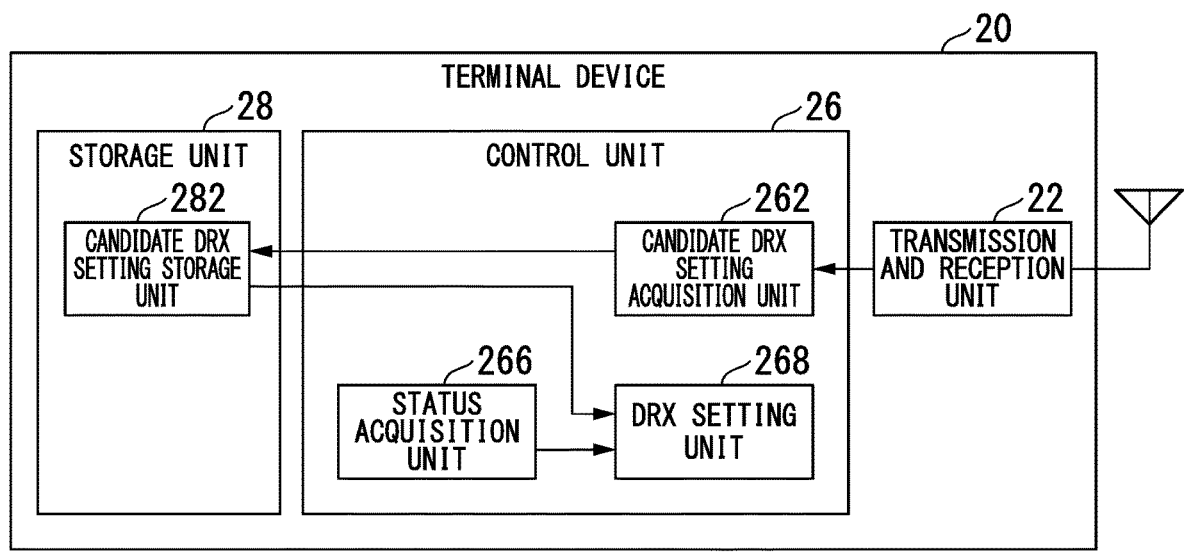
FIG. 3 is a block diagram illustrating a configuration example of a terminal device according to the first embodiment.

FIG. 3 is a block diagram illustrating a configuration example of the terminal device 20 according to the present embodiment.

The terminal device 20 is configured to include a transmission and reception unit 22, a control unit 26, and a storage unit 28.

The transmission and reception unit 22 is communicably connected to other devices, and functions as a communication unit that transmits and receives various types of data. The transmission and reception unit 22 is, for example, a wireless communication interface.

The control unit 26 executes various processes for realizing functions of the terminal device 20. The control unit 26 performs various types of control relating to communication of the terminal device 20. The control unit 26 performs, for example, a process for receiving reception data which is transmitted from a destination device through the base station device 10, a process for transmitting transmission data to the destination device through the base station device 10, control of the carrier frequency of the transmission and reception unit 22, and the like. Further, the control unit 26 controls the operation state of the terminal device 20 such as regular reception, C-DRX, I-DRX, or standby. The control unit 26 executes the start and end of clocking of the above-described timer relating to control of the operation state.

The control unit 26 is configured to include a candidate DRX setting acquisition unit 262, a status acquisition unit 266, and a DRX setting unit 268.

The candidate DRX setting acquisition unit 262 acquires a plurality of candidate DRX settings which are transmitted from the base station device 10 through the transmission and reception unit 22. The candidate DRX setting acquisition unit 262 receives communication parameters from the base station device 10, for example, during communication start connection with the base station device 10, and extracts a candidate DRX setting from the received communication parameters. The candidate DRX setting acquired at this point in time is used in C-DRX. Meanwhile, in a case where the host device (terminal device 20) is in a C-DRX state in which C-DRX is executed, the candidate DRX setting acquisition unit 262 may monitor a control channel, and detect a plurality of candidate DRX settings which are transmitted through the monitored control channel. In a case where the host device is in an I-DRX state where I-DRX is executed, the candidate DRX setting acquisition unit 262 receives a broadcast control channel, and detects a plurality of candidate DRX settings which are delivered through the received broadcast control channel. The candidate DRX setting acquisition unit 262 stores the acquired candidate DRX setting in the candidate DRX setting storage unit 282.

Meanwhile, the candidate DRX setting can be repeatedly transmitted from the base station device 10, but the candidate DRX setting acquisition unit 262 may update the candidate DRX setting stored in the candidate DRX setting storage unit 282 to the latest candidate DRX setting. Even in a case where the operation state of the host device is a regular reception state, the candidate DRX setting acquisition unit 262 may receive a candidate DRX setting.

The status acquisition unit 266 acquires operation status information indicating the operation status of the host device. The status acquisition unit 266 detects an operation status according to the necessity of communication or a required communication quality such as, for example, the type of application, a terminal movement state, a time slot, a terminal power state, or a use frequency band.

The status acquisition unit 266 outputs the operation status information indicating the detected operation status to the DRX setting unit 268.

The DRX setting unit 268 reads out a plurality of candidate DRX settings which are stored in the candidate DRX setting storage unit 282, and selects one candidate DRX setting, corresponding to an operation status indicated by the operation status information which is input from the status acquisition unit 266, from the plurality of read-out candidate DRX settings. The DRX setting unit 268 may set a relationship table indicating a relationship between an operation status and a DRX setting in advance. The DRX setting unit 268 can specify a candidate DRX setting corresponding to an operation status indicated by the operation status information by referring to the relationship table. The DRX setting unit 268 determines the selected candidate DRX setting as a DRX setting used in DRX.

The control unit 26 receives a signal transmitted by the base station device 10 through the transmission and reception unit 22 in a reception period of time designated in the DRX setting determined by the DRX setting unit 268 for each DRX period indicated by the DRX setting. In a case where data transmitted toward the host device by the base station device 10 is included in the signal, the control unit 26 generates predetermined response information with respect to the data, and transmits the generated response information to the base station device 10 through the transmission and reception unit 22 in accordance with predetermined scheduling. An example of scheduling of response information will be described later.

The storage unit 28 stores various types of data used in processes which are executed by the terminal device 20 and various types of data acquired in the processes. The storage unit 28 stores, for example, a program for controlling the processes executed by the terminal device 20 or data transmitted and received to and from the base station device 10.

The storage unit 28 is configured to include a recording medium such as a random access memory (RAM) or an electrically erasable programmable read-only memory (EEPROM) as hardware. The storage unit 28 is configured to include the candidate DRX setting storage unit 282 as a functional configuration. The candidate DRX setting storage unit 282 stores a plurality of candidate DRX settings acquired by the candidate DRX setting acquisition unit 262.

Next, an example of a relationship between an operation status and a DRX setting will be described.

The type of application means a type classified in terms of how to need to stand by for the reception of data from other devices, in association with a process relating to the execution of an application, with respect to an application executed by the control unit 26. The execution of an application means executing a process indicated by a command described in the application. An example of the type of application includes the type of application that requires standby in a low delay (hereinafter, called a "low-delay standby application"), normal application, application that does not require standby in a low delay (hereinafter, called a "low-delay standby unnecessary application"), or the like. An example of the low-delay standby application includes an emergency report application for executing an emergency report, or the like. An example of the normal application includes a call application for executing a call to a destination device, or the like. An example of the low-delay standby unnecessary application includes an e-mail application for receiving e-mail, or the like. The DRX setting unit 268 may, for example, make a short period DRX setting with respect to the low-delay standby application, make an intermediate period DRX setting with respect to the normal application, and make a long period DRX setting with respect to the low-delay standby unnecessary application. Consequently, the status acquisition unit 266 specifies an application which is executed by the control unit 26 for each predetermined time. A relationship table indicating candidate DRX for each application may be set in the DRX setting unit 268 in advance, and candidate DRX corresponding to a newly specified application may be specified by referring to the relationship table. As an example, the DRX periods relating to the short period DRX setting, the intermediate period DRX setting, and the long period DRX setting are 0.64 s, 1.28 s, and 2.56 s, respectively.

The terminal movement state means the movement state of the terminal device 20 that influences a change in the propagation path of wireless communication. An example of the terminal movement state includes the type of high-speed movement, low-speed movement, standstill, or the like. The DRX setting unit 268 may, for example, make a short period DRX setting with respect to the high-speed movement, make an intermediate period DRX setting with respect to the low-speed movement, and make a long period DRX setting with respect to the standstill. Consequently, the status acquisition unit 266 performs, for example, time integration on a component based on movement which is obtained by subtracting a component of gravitational acceleration from acceleration in each sensitivity axis direction detected by a triaxial acceleration sensor which is included in the terminal device 20. The status acquisition unit 266 detects a speed obtained by time integration as the movement speed of the terminal device 20 based on the square root of the sum of squares between sensitivity axis directions. The DRX setting unit 268 may set a relationship table indicating a relationship with a candidate DRX setting for each range of a movement speed corresponding to a movement state which is set in advance, and specify a candidate DRX setting corresponding to the range of a movement speed including a movement speed detected by referring to the relationship table.

The time slot means a time slot at which the terminal device 20 performs a standby operation. An example of the time slot includes the type of daytime, nighttime, or the like. The DRX setting unit 268 may, for example, make an intermediate period DRX setting with respect to the daytime, and make a long period DRX setting with respect to the nighttime. The time slot for each type may be set in the status acquisition unit 266 in advance, and may be able to be changed to a time slot indicated in accordance with a user's operation input. The status acquisition unit 266 clocks the current time. A relationship table indicating candidate DRX for set time slot may be set in the DRX setting unit 268 in advance, and candidate DRX corresponding to a time slot in which the current time is included may be set therein.

The terminal power state is a power demand state in the host device (terminal device 20). The terminal power state may include, for example, the presence or absence of connection with an external power supply, the presence or absence (on/off) of the operation of a device that consumes power of a display, or the like. The DRX setting unit 268 may, for example, make a short period DRX setting during connection with a power supply, make an intermediate period DRX setting during non-connection with the power supply and in a case that the operation state of a display is an on-state, and make a long period DRX setting during non-connection with the power supply and in a case that the operation state of the display is an off-state. Consequently, the status acquisition unit 266 detects power which is supplied from an external power supply, and determines the presence or absence of connection based on the detected power. In addition, the status acquisition unit 266 specifies an operation state for each device included in the terminal device 20. A relationship table indicating candidate DRX for each set terminal power state may be set in the DRX setting unit 268 in advance, and candidate DRX corresponding to the detected terminal power state may be set therein.

The use frequency band means a frequency band of a cell in which a terminal performs a standby operation. For example, in the case of standby in a high-frequency band such as a millimeter-wave band, there is the possibility of transmission data being transmitted by performing beam forming from the base station device 10. In that case, transmission data from the base station device 10 does not necessarily reach the terminal device 20 in a state of maintaining a sufficient strength due to switching of a beam. In consideration of this, the DRX setting unit 268 selects a DRX setting having an approximately short reception period in order to maintain synchronization with the base station device 10. On the contrary, in a case where a lower frequency band is used in communication with the base station device 10, transmission data is transmitted to the entire cell without performing beam forming. In that case, the DRX setting unit 268 selects a DRX setting having a longer period. However, since switching of a beam, a cell change or the like is also relevant to the movement state of the terminal device 20, it is more preferable that the DRX setting unit 268 performs a DRX setting in consideration of even the movement state as described above.

Meanwhile, the status acquisition unit 266 may acquire a plurality of pieces of element information serving as elements of the operation status. The DRX setting unit 268 may select candidate DRX in which a DRX period is minimized from candidate DRX corresponding to each of the plurality of pieces of element information. The control unit 26 receives reception data in a reception period of time for each DRX period indicated in the selected candidate DRX. In a case where two or more running applications are present, the DRX setting unit 268 may select candidate DRX independently of the respective applications, and may select candidate DRX in which a DRX period is minimized among candidate DRXs selected with respect to the respective applications. In communication relating to a running application, the control unit 26 receives reception data in a reception period of time for each DRX period indicated in candidate DRX selected with respect to the application.

In addition, the DRX setting unit 268 may specify a candidate DRX setting indicated in accordance with a user's operation input among a plurality of candidate DRX settings.

(Example of Candidate DRX Setting)

Next, an example of a candidate DRX setting will be described.

Figure 4:
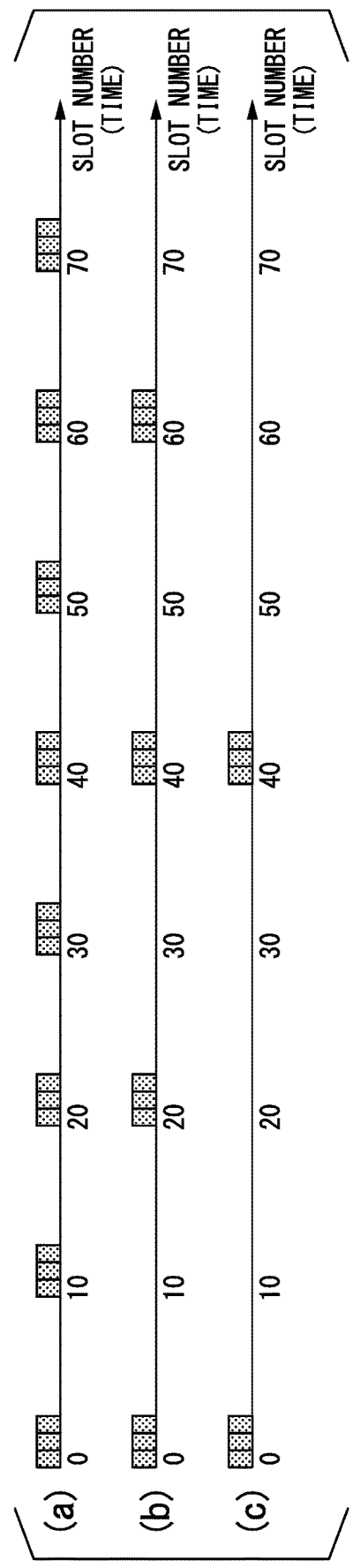
FIG. 4 is a conceptual diagram illustrating an example of candidate DRX settings.

FIG. 4 is a conceptual diagram illustrating an example of candidate DRX settings. In FIG. 4, the horizontal axis represents a time. The unit of the time is the number of slots. One slot is, for example, an interval of 0.5 ms.

Here, (a), (b), and (c) are examples of a short period DRX setting, an intermediate period DRX setting, and a long period DRX setting, respectively. In the example shown in FIG. 4, DRX periods indicated in the short period DRX setting, the intermediate period DRX setting, and the long period DRX setting are 10, 20, and 40 slots, respectively. In addition, the reception periods of time are initial three slots of each DRX period in any of the candidate DRX settings. An individual quadrangle indicates a monitoring slot, that is, a slot within a reception period of time, and an interval in which a quadrangle is not shown indicates a non-reception period of time. In addition, in the example shown in FIG. 4, it is assumed that the terminal device 20 selects any one of a plurality of candidate DRX settings at slot 0, and starts DRX in accordance with the selected candidate DRX setting. At slots 0 to 2, reception periods of time indicated by all the candidate DRX settings of (a) to (c) are duplicated, and reception periods of time are repeated in DRX periods designated at the subsequent time.

(Transmission Example)

Next, a transmission example of response information from the terminal device 20 and a transmission example of transmission data from the base station device 10 will be described. An example to be described next is an example of application to C-DRX performed by the terminal device 20.

Figure 5:
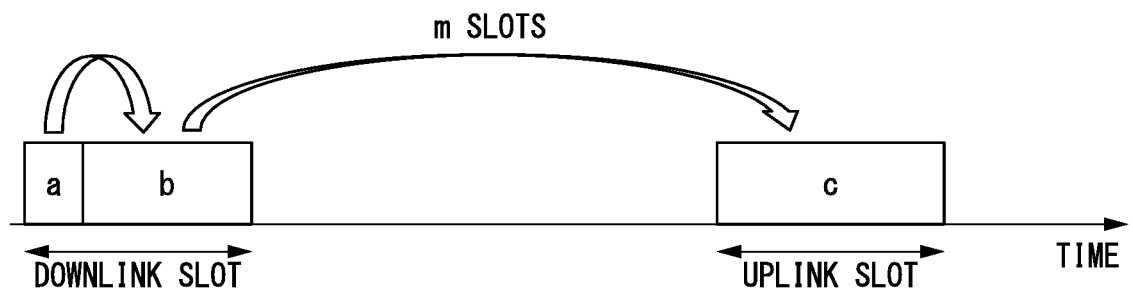
FIG. 5 is a diagram illustrating an example of a relationship between transmission timings of transmission data and response information.

FIG. 5 is a diagram illustrating an example of a relationship between transmission timings of transmission data and response information.

FIG. 5 shows a case where ACK/NACK information for downlink transmission data is transmitted to the base station device 10, as response information, at a slot (uplink slot) after m (m is an integer equal to or greater than 1) slots from a slot (downlink slot) at which downlink transmission data is transmitted or received. At the downlink slot, the scheduling processing unit 164 of the base station device 10 transmits scheduling information a and user data b as transmission data. The control unit 26 of the terminal device 20 receives transmission data transmitted by the base station device 10 as reception data, and determines whether an error has been detected by performing an error detection process for each slot with respect to the reception data. In a case that it is determined that the data has been normally received without detecting an error, the control unit 26 generates a positive acknowledgment as response information c, and transmits the response information c generated in the uplink slot to the base station device 10. In a case that it is determined that an error has been detected and the data has not been normally received, the control unit 26 generates a negative acknowledgement as the response information c, and transmits the response information c generated in the uplink slot to the base station device 10.

Next, a transmission example of transmission data from the base station device 10 will be described.

Figure 6:
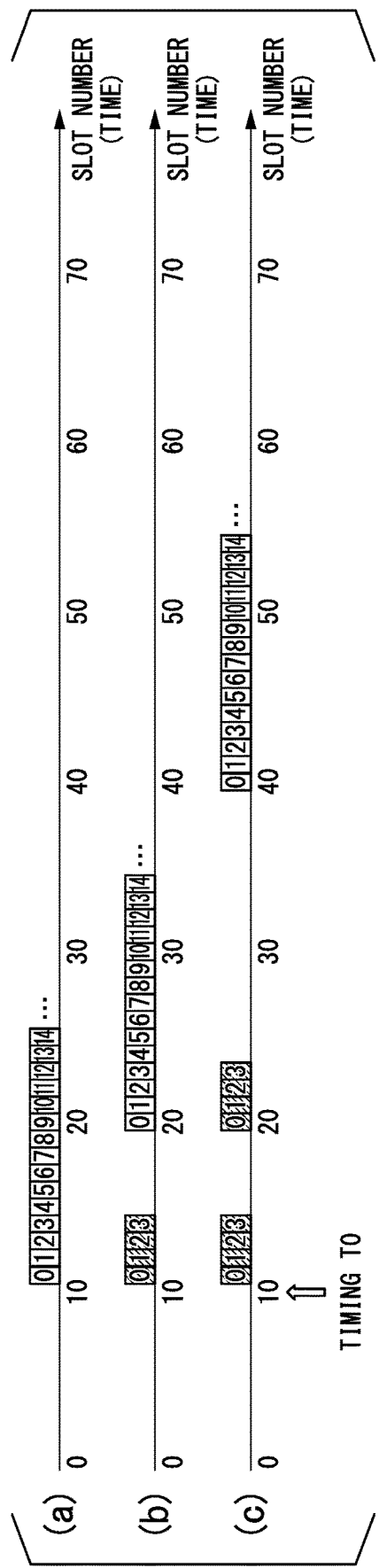
FIG. 6 is a diagram illustrating a transmission example of transmission data.
Figure 7:
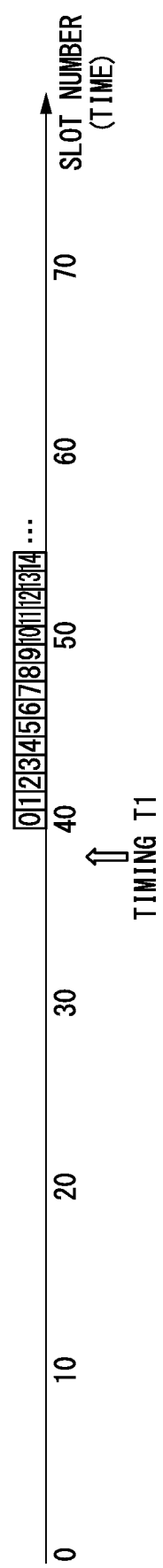
FIG. 7 is a diagram illustrating another transmission example of transmission data.

FIGS. 6 and 7 are diagrams illustrating transmission examples of transmission data.

In the example shown in FIG. 6, a case is exemplified in which the candidate DRX setting processing unit 162 of the base station device 10 transmits three candidate DRX settings shown in (a) to (c) of FIG. 4 to the terminal device 20, and the scheduling processing unit 164 acquires transmission data at timing T0 (slot 10). In addition, the scheduling processing unit 164 of the base station device 10 can perform transmission at a timing of a slot subsequent to the slot at which the transmission data is acquired. In this example, a relation of m=3 is established. In addition, a DRX period relating to each candidate DRX setting is started at slot 0.

In a case where a relationship between the transmission timing of transmission data shown in FIG. 5 and the transmission timing of response information with respect to the transmission data is adopted, the scheduling processing unit 164 of the base station device 10 transmits the transmission data in a transmission period of time of m+1(=4) slots from the start of a reception period of time to a slot after at least m(=3) slots with respect to each DRX period indicated by each candidate DRX setting. In addition, in a case where a response signal from the terminal device 20 cannot be received in the DRX period of each candidate DRX setting, the scheduling processing unit 164 selects another candidate DRX setting which is not selected, and repeats a process of transmitting transmission data in a transmission period of time started from the start of a reception period of time given in the selected candidate DRX setting. The scheduling processing unit 164 repeatedly executes this process until acknowledgement is received from the terminal device 20.

In addition, (a) of FIG. 6 exemplifies a case where the DRX setting unit 268 of the terminal device 20 selects the short period DRX setting. The scheduling processing unit 164 of the base station device 10 transmits the transmission data acquired at slot 10 to the terminal device 20 between from the next slot 11 within the reception period of the short period DRX setting to slot 14 having the possibility of the response signal from the terminal device 20 being able to be received. The control unit 26 of the terminal device 20 can receive the transmission data from the base station device 10 at slots 10 to 12 which are a reception period of time. In a case that the transmission data is normally received at slot 11, the control unit 26 of the terminal device 20 starts regular reception by releasing DRX, and transmits an acknowledgement for the transmission data at slot 11 to the base station device 10 at slot 14. In a case that an acknowledgement is received from the terminal device 20, the scheduling processing unit 164 of the base station device 10 determines that the terminal device 20 has released a DRX state, and continues to transmit transmission data which is not yet transmitted from slot 15 to the terminal device 20.

In addition, (b) of FIG. 6 exemplifies a case where the DRX setting unit 268 of the terminal device 20 selects the intermediate period DRX setting. The scheduling processing unit 164 of the base station device 10 transmits the transmission data to the terminal device 20 between slots 11 and 14 which are the transmission period of time of the short period DRX setting as described above. However, since slots 11 to 14 are all outside the reception period of time indicated by the intermediate period DRX setting, the control unit 26 of the terminal device 20 cannot receive the transmission data from the base station device 10. The scheduling processing unit 164 of the base station device 10 determines that the terminal device 20 does not use the short period DRX setting, and transmits the transmission data to the terminal device 20 between slots 20 and 23 which are a transmission period of time (period of time from a slot at which the base station device 10 transmits the transmission data to a slot having the possibility of the response signal from the terminal device 20 being able to be received) starting from the time of start of the reception period of time indicated by the intermediate period DRX setting. In a case that the transmission data from the base station device 10 is normally received at slot 20 which is a point in time of the start of slots 20 to 22 which are a reception period of time, the control unit 26 of the terminal device 20 starts regular reception by releasing DRX, and transmits an acknowledgement for transmission data at slot 20 to the base station device 10 at slot 23. In a case that an acknowledgement is received from the terminal device 20, the scheduling processing unit 164 of the base station device 10 determines that the terminal device 20 has released a DRX state, and continues to transmit transmission data which is not yet transmitted from slot 24 to the terminal device 20.

In addition, (c) of FIG. 6 exemplifies a case where the DRX setting unit 268 of the terminal device 20 selects the long period DRX setting. The scheduling processing unit 164 of the base station device 10 transmits the transmission data to the terminal device 20 between slots 11 and 14 which are the transmission period of time of the short period DRX setting as described above. However, since slots 11 to 14 are all outside the reception period of time of the long period DRX setting, the control unit 26 of the terminal device 20 cannot receive the transmission data from the base station device 10. The scheduling processing unit 164 of the base station device 10 determines that the terminal device 20 does not use the short period DRX setting, and transmits the transmission data to the terminal device 20 between slots 20 and 23 which are a transmission period of time starting from the time of start of the reception period indicated by the intermediate period DRX setting. Since slots 20 to 23 are all outside the range of the reception period of time indicated by the long period DRX setting, the control unit 26 of the terminal device 20 cannot receive the transmission data from the base station device 10. The scheduling processing unit 164 of the base station device 10 determines that the terminal device 20 does not use the intermediate period DRX setting, and transmits the transmission data to the terminal device 20 between slots 40 and 43 which are a transmission period of time starting from the time of start of the reception period of the long period DRX setting. In a case that the transmission data is normally received at slot 40 which is a point in time of the start of slots 40 to 42 which are a reception period of time indicated by the long period DRX setting, the control unit 26 starts regular reception by releasing DRX, and transmits an acknowledgement for the transmission data at slot 40 to the base station device 10 at slot 43. In a case that an acknowledgement is received from the terminal device 20, the scheduling processing unit 164 of the base station device 10 determines that the terminal device 20 has released a DRX state, and continues to transmit transmission data which is not yet transmitted from slot 44 to the terminal device 20.

Meanwhile, on the assumption that the terminal device 20 frequently changes a DRX setting, the scheduling processing unit 164 may transmit the transmission data in each reception period of time of all the candidate DRX settings. For example, in the example of (c) of FIG. 6, the scheduling processing unit 164 determines that the terminal device 20 uses neither the short period DRX setting nor the long period DRX setting, and transmits the transmission data between slots 40 and 43 while skipping slots 30 to 33, but may also transmit the transmission data between slots 30 and 33 in consideration of the possibility that the terminal device 20 changes the DRX settings.

FIG. 7 exemplifies a case where the scheduling processing unit 164 of the base station device 10 acquires the transmission data at timing T1 (slot 38). In addition, the scheduling processing unit 164 can transmit the transmission data at a timing of a slot subsequent to a slot at which the transmission data is acquired. In this example, slots 40 to 42 are a reception period of time common to the long period DRX setting, the intermediate period DRX setting, and the short period DRX setting. In slots 40 to 42, the scheduling processing unit 164 of the base station device 10 transmits the acquired transmission data to the terminal device 20.

In a case that the transmission data is normally received from the base station device 10 at slot 40, the control unit 26 of the terminal device 20 starts regular reception by releasing DRX, and transmits an acknowledgement for the transmission data at slot 40 to the base station device 10 at slot 43. The scheduling processing unit 164 of the base station device 10 receives an acknowledgement from the terminal device 20, and continues to transmit transmission data which is not yet transmitted. Therefore, in a case where the transmission data is acquired at timing T0, the scheduling processing unit 164 can continue to transmit the transmission data without duplicately transmitting the transmission data as in a case where the terminal device 20 uses the intermediate period DRX setting or the long period DRX setting.

As shown in FIGS. 6 and 7, the possibility of the duplicate transmission of transmission data being generated differs depending on a timing at which the transmission data is transmitted. In addition, even in a case where any of the candidate DRX settings is selected at a slot at which the reception periods of time duplicate each other between candidate DRX settings, the duplicate transmission of the transmission data is released. Consequently, candidate DRX settings may be stored in the DRX setting storage unit 182 in advance so that the reception periods of time duplicate each other between a plurality of candidate DRX settings. In addition, the candidate DRX setting processing unit 162 may receive a plurality of candidate DRX settings in which the reception periods of time duplicate each other from the candidate DRX settings stored in the DRX setting storage unit 182.

Further, the DRX period of each of the plurality of candidate DRX settings may be the integral multiple of a shortest DRX period. The shortest DRX period means a DRX period which is the shortest among the DRX periods of the plurality of candidate DRX settings.

Meanwhile, in the examples shown in FIGS. 6 and 7, a relation of m=3 is established, but there is no limitation thereto. As m becomes smaller, the base station device 10 can reduce the number (m+1) of slots at which the transmission data is duplicately transmitted for each reception period of time given in the candidate DRX settings.

Figure 8:
FIG. 8 is a diagram illustrating another example of a relationship between transmission tunings of transmission data and response information.

For example, in the case of a self-constrained operation shown in FIG. 8, the number of slots at which the base station device 10 transmits the transmission data can be limited to one as the amount of information that becomes useless without being received in a case that the terminal device 20 is not in the reception period of time. In addition, in a case where time division duplex (TDD) is adopted in communication between the base station device 10 and the terminal device 20, m may be variable. Here, m is reported to the terminal device 20 in a state of being included in scheduling information which is generated by the scheduling processing unit 164 of the base station device 10. Alternatively, a transmission slot according to a slot number may be defined in advance in the scheduling processing unit 164.

In the example of timings of transmission data and response information shown in FIG. 8, the scheduling processing unit 164 of the base station device 10 transmits scheduling information a and the user data b to the terminal device 20 in a predetermined downlink signal interval which is a portion of one slot. The downlink signal interval is started from the head of the slot. The control unit 26 of the terminal device 20 receives the transmission data transmitted by the base station device 10 in the downlink signal interval of the slot as reception data, and determines whether an error has been detected by performing an error detection process on the reception data. The control unit 26 generates a positive acknowledgment as the response information c in a case that it is determined that the data has been normally received without detecting an error, generates a negative acknowledgement as the response information c in a case that it is determined that an error has been detected and the data has not been normally received, and transmits the response information c to the base station device 10 in a predetermined uplink signal interval of another portion which is a common slot with respect to the slot. The uplink signal interval ends at the tail of the slot. The head of the uplink signal interval may be provided with a time later than the tail of the downlink signal interval, that is, a gap between the uplink signal interval and the downlink signal interval.

Meanwhile, in a case that single response information c is received, the scheduling processing unit 164 of the base station device 10 determines that the terminal device 20 has released a DRX state, and determines that the transmission data is continuously transmitted to the terminal device 20, but there is no limitation thereto. The scheduling processing unit 164 may determine that the terminal device 20 has released a DRX state in a case that the response information c is received even at one slot, for example, within temporally continuous l (l is an integer equal to or greater than 2) slots, and determine that transmission data which is not yet transmitted is continuously transmitted to the terminal device 20. That is, in a case that the response information c is not received continuously for l slots, the scheduling processing unit 164 determines that the terminal device 20 is in a DRX state, and does not continue to transmit the transmission data. Here, the scheduling processing unit 164 transmits the transmission data at each slot within a transmission period of time from the start of a reception period of time to a slot after at least m+1 slots with respect to each DRX period indicated by each candidate DRX setting. Thereby, it is possible to avoid the transmission data from stagnating without being transmitted in a case where propagation quality deteriorates.

Meanwhile, in the above-described example, a case is exemplified in which the scheduling processing unit 164 of the base station device 10 repeats a series of processes of transmitting the transmission data through sequential update to another unprocessed candidate DRX setting in a transmission period of time corresponding to a reception period of time indicated by another candidate DRX setting until the response information c indicating a positive acknowledgment or a negative acknowledgement is received, but there is no limitation thereto. Until a point in time of the start of a reception period of time indicated by another unprocessed candidate DRX setting, the scheduling processing unit 164 may not receive the response information c indicating a positive acknowledgment or a negative acknowledgement for the transmission data transmitted in a transmission period of time corresponding to a reception period of time indicated by candidate DRX immediately before the point in time. In that case, the scheduling processing unit 164 may determine that the a series of processes are repeated through update to another unprocessed candidate DRX setting.

Alternatively, in that case, even in a case where the point in time of the start of a reception period of time indicated by another unprocessed candidate DRX setting passes by, the scheduling processing unit 164 may continue to transmit the transmission data until a timing (transmission period of time) in a case that the response information c can be received. This is because, even in a case where the terminal device 20 uses another unprocessed candidate DRX setting, the scheduling processing unit 164 can receive the continuously transmitted transmission data. In a case where the response information c cannot be received at a timing in a case that the response information c can be received, the scheduling processing unit 164 may transmit the transmission data in a transmission period of time corresponding to a reception period of time indicated by another unprocessed candidate DRX setting.

Figure 9:
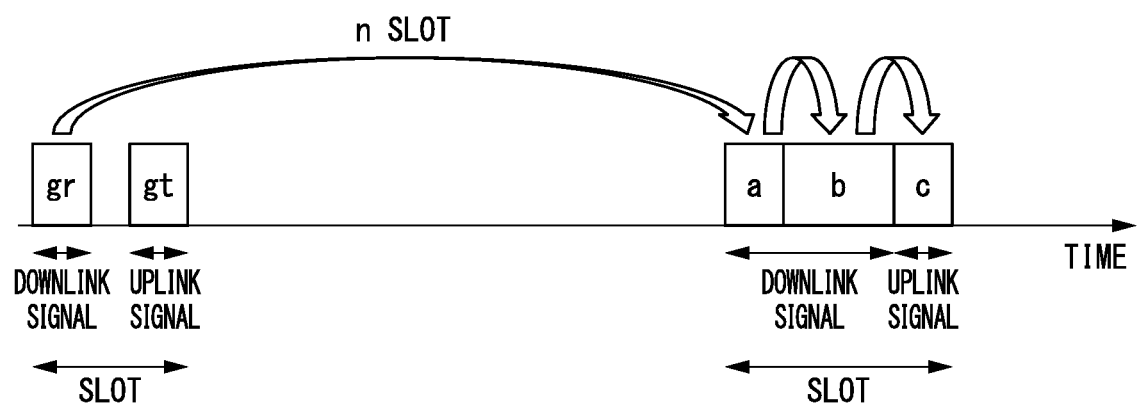
FIG. 9 is a diagram illustrating still another example of a relationship between transmission timings of transmission data and response information.

Meanwhile, as shown in FIG. 9, in a case that the transmission data destined for the terminal device 20 is acquired, the scheduling processing unit 164 of the base station device 10 may transmit advance indication information gr indicating the presence of the transmission data (that is, the scheduling information a and the user data b) destined for the host device (terminal device 20) to the terminal device 20 after predetermined n (n is an integer equal to or greater than 1) slots in a downlink signal interval of a slot having the possibility of the terminal device 20 being in the reception period of time. In a case that the advance indication information gr is received from the base station device 10, the control unit 26 of the terminal device 20 generates advance indication acknowledgement information gt, and transmits the advance indication acknowledgement information gt to the base station device 10 in an uplink signal interval within a slot at which the advance indication information gr is received. The advance indication acknowledgement information gt is confirmation information indicating that the advance indication information gr is received in the terminal device 20. In a case that the advance indication acknowledgement information gt is received from the terminal device 20 in the uplink signal interval within a slot at which the advance indication information gr is transmitted, the scheduling processing unit 164 of the base station device 10 transmits the transmission data in a slot after n slots from a slot at which the advance indication acknowledgement information gt is transmitted.

In the present embodiment, the scheduling processing unit 164 transmits the advance indication information gr to the terminal device 20 at a slot of the head of a reception period of time indicated by a plurality of candidate DRXs. The control unit 26 of the terminal device 20 stops DRX (in a case that being executed) at a slot after n slots from a slot at which at least the advance indication information gr is received, and starts the regular reception of the transmission signal from the base station device 10. On the other hand, the scheduling processing unit 164 of the base station device 10 continuously transmits the transmission data from the slot after n slots. In the example shown in FIG. 9, the self-constrained operation illustrated in FIG. 8 is applied at a slot at which the transmission data from the base station device 10 is transmitted.

Since the advance indication information gr has a relatively small amount of information, the sufficient number of slots required for a single transmission is one. Therefore, the transmission data itself may not be used as a target for duplicate transmission by using the advance indication information gr as a target for duplicate transmission, and thus slots having the possibility of duplicate transmission being performed can be limited to one slot of the head of a reception period of time indicated by each candidate DRX setting. In addition, since the reception period of time of each candidate DRX setting is allowed to be reduced, it is possible to reduce the power consumption of the terminal device 20.

Figure 10:
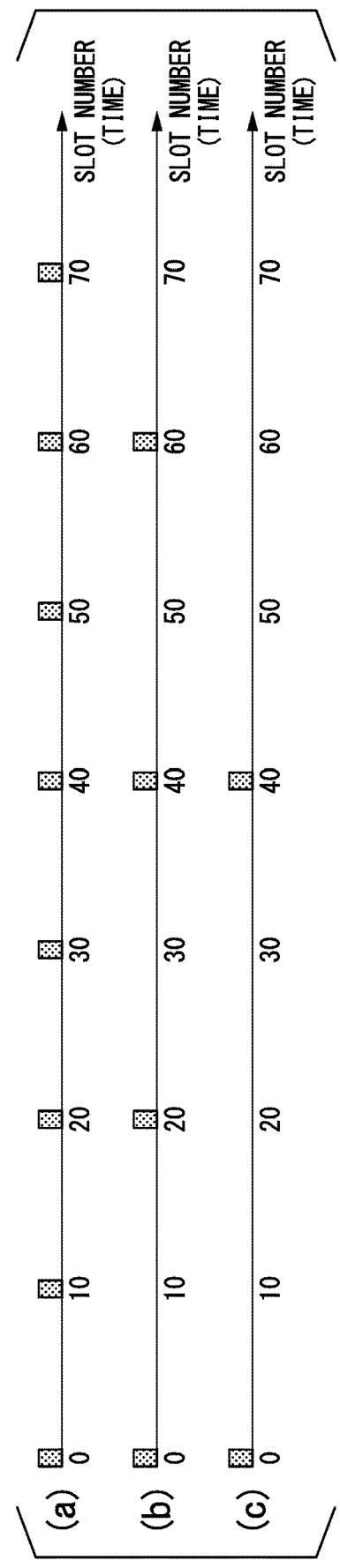
FIG. 10 is a diagram illustrating another example of candidate DRX settings.

FIG. 10 is a diagram illustrating an example of candidate DRX settings in a case where the base station device 10 transmits the advance indication information gr as shown in FIG. 9. Here, (a), (b), and (c) are examples of a short period DRX setting, an intermediate period DRX setting, and a long period DRX setting, respectively. The DRX periods of a short period DRX setting, an intermediate period DRX setting, and a long period DRX setting shown in FIG. 10 10, 20, and 40 slots, respectively, similarly to the DRX periods shown in FIG. 4. However, reception periods of time are limited to initial one slot of each DRX period for receiving the advance indication information gr in any of the candidate DRX settings.

Next, a transmission example of transmission data from the base station device 10 will be described.

Figure 11:
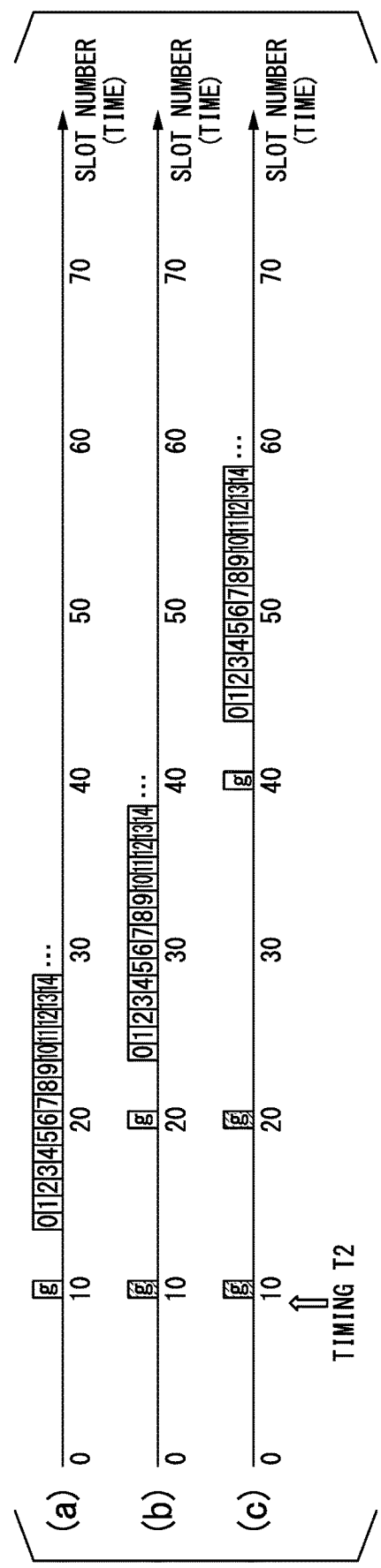
FIG. 11 is a diagram illustrating still another transmission example of transmission data.

FIG. 11 exemplifies a case where the scheduling processing unit 164 of the base station device 10 acquires the transmission data at timing T2 (slot 9). However, a relation of n=4 is established. In FIG. 11, "g" surrounded by a quadrangle indicates a slot at which the advance indication information gr and the advance indication acknowledgement information gt are transmitted and received.

In the example shown in (a) of FIG. 11, a case is exemplified in which the DRX setting unit 268 of the terminal device 20 selects the short period DRX setting. The scheduling processing unit 164 of the base station device 10 transmits the advance indication information gr to the terminal device 20 at slot 10 of the head of the reception period of the short period DRX setting. The control unit 26 of the terminal device 20 receives the advance indication information gr at slot 10 which is a reception period of time, and transmits the advance indication acknowledgement information gt to the base station device 10 as its response information at slot 10. The control unit 26 of the terminal device 20 stops DRX at slot 14 after four slots from slot 10, and starts regular reception. On the other hand, in a case that the advance indication acknowledgement information gt is received from the terminal device 20 at slot 10, the scheduling processing unit 164 of the base station device 10 determines that the terminal device 20 has released a DRX state, and starts continuous transmission of the transmission data destined for the terminal device 20 from slot 14 after four slots.

In addition, (b) of FIG. 11 exemplifies a case where the DRX setting unit 268 of the terminal device 20 selects the intermediate period DRX. The scheduling processing unit 164 of the base station device 10 transmits the advance indication information gr to the terminal device 20 at slot 10 which is the reception period of time of the short period DRX. However, since slot 10 is outside the range of the reception period of time of the intermediate period DRX setting, the control unit 26 of the terminal device 20 cannot receive the advance indication information gr from the base station device 10. The scheduling processing unit 164 of the base station device 10 transmits the advance indication information gr at slot 20 which is the reception period of time of the intermediate period DRX. In a case that the advance indication information gr is normally received at slot 20 which is a reception period of time, the control unit 26 of the terminal device 20 transmits the advance indication acknowledgement information gt as its response information to the base station device 10 at slot 20, and starts regular reception by releasing DRX. In a case that the advance indication acknowledgement information gt is received from the terminal device 20 at slot 20, the scheduling processing unit 164 of the base station device 10 determines that the terminal device 20 has released a DRX state, and starts continuous transmission of the transmission data at slot 24 after four slots from slot 20.

In addition, (c) of FIG. 11 exemplifies a case where the DRX setting unit 268 of the terminal device 20 selects the long period DRX. The scheduling processing unit 164 of the base station device 10 transmits the advance indication information gr to the terminal device 20 at slot 10 which is the reception period of time of the short period DRX. However, since slot 10 is outside the range of the reception period of time of the long period DRX, the control unit 26 of the terminal device 20 cannot receive the advance indication information gr from the base station device 10. The scheduling processing unit 164 of the base station device 10 transmits the advance indication information gr at slot 20 which is the reception period of time of the intermediate period DRX. Since slot 20 is outside the range of the reception period of time of the long period DRX, the control unit 26 of the terminal device 20 cannot receive the advance indication information gr from the base station device 10. The scheduling processing unit 164 of the base station device 10 transmits the transmission data at slot 40 which is the reception period of time of the long period DRX. In a case that the advance indication information gr is normally received at slot 40 which is the reception period of time of the long period DRX, the control unit 26 of the terminal device 20 transmits the advance indication acknowledgement information gt as response information with respect to the advance indication information gr at slot 40 to the base station device 10 at slot 40, and starts regular reception by releasing DRX. In a case that the advance indication acknowledgement information gt is received from the terminal device 20, the scheduling processing unit 164 of the base station device 10 determines that the terminal device 20 has released a DRX state, and starts continuous transmission of the transmission data from slot 44 after four slots from slot 40.

Figure 12:
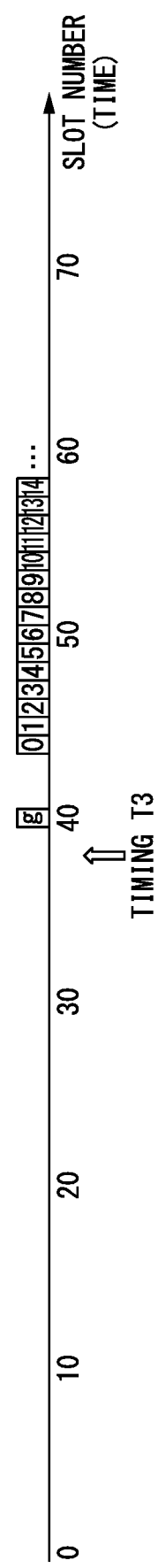
FIG. 12 is a diagram illustrating still another transmission example of transmission data.

FIG. 12 exemplifies a case where the transmission data is acquired at timing T3 (slot 37). In this example, slot 40 is a reception period of time common to the long period DRX setting, the intermediate period DRX setting, and the short period DRX setting. At slot 40, the scheduling processing unit 164 of the base station device 10 transmits the advance indication information gr to the terminal device 20. In a case that the advance indication information gr is normally received from the base station device 10 at slot 40, the control unit 26 of the terminal device 20 transmits the advance indication acknowledgement information gt as its response information to the base station device 10 at slot 40, and starts regular reception by releasing DRX. In a case that the advance indication acknowledgement information gt is received from the terminal device 20 at slot 40, the scheduling processing unit 164 of the base station device 10 determines that the terminal device 20 has released a DRX state, and starts continuous transmission of the transmission data from slot 44 after four slots from slot 40.

(Transmission Process)

Next, an example of processes performed by the base station device 10 according to the present embodiment will be described.

Figure 13:
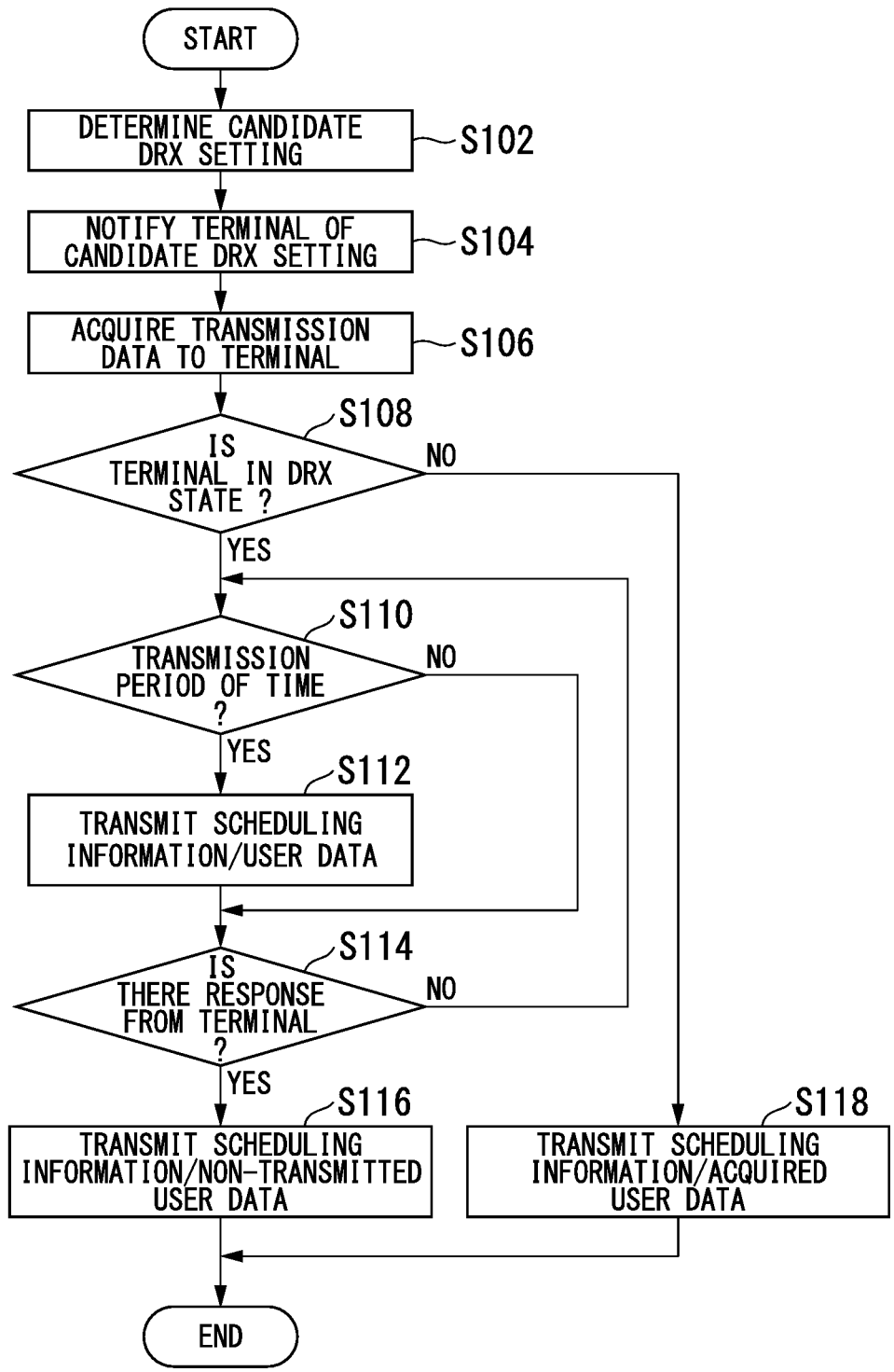
FIG. 13 is a flow chart illustrating an example of processes of the base station device according to the first embodiment.

FIG. 13 is a flow chart illustrating an example of processes performed by the base station device 10 according to the present embodiment.

(Step S102) The candidate DRX setting processing unit 162 of the base station device 10 determines candidate DRX of which the terminal device 20 is notified from DRX settings stored in advance in the DRX setting storage unit 182. Thereafter, the flow proceeds to the process of step S104.

(Step S104) The candidate DRX setting processing unit 162 notifies the terminal device 20 of the determined candidate DRX. Thereafter, the flow proceeds to the process of step S106.

(Step S106) The scheduling processing unit 164 acquires the transmission data (user data) transmitted to the terminal device 20. Thereafter, the flow proceeds to the process of step S108.

(Step S108) The scheduling processing unit 164 determines whether the operation state of the terminal device 20 is a DRX state or a regular reception state. As described above, the control unit 26 of the terminal device 20 starts clocking of a DRX timer in a case that there is no transmission data, and starts DRX in a case that a DRX transition time elapses from the start of clocking. In the example shown in FIG. 13, the scheduling processing unit 164 has the same DRX timer as that of the terminal device 20, and starts clocking performed by the DRX timer in a case that there is no transmission data which is transmitted and received to and from the terminal device 20. The scheduling processing unit 164 can estimate the start of DRX in the terminal device 20 in a case that the DRX transition time elapses from the start of clocking and the DRX timer expires. Consequently, the scheduling processing unit 164 determines that the operation state of the terminal device 20 is a regular reception state until the DRX transition time elapses from the start of clocking, and determines that the terminal device 20 is in a DRX state after the DRX transition time has elapsed from the start of clocking. In a case that it is determined that the operation state of the terminal device 20 is a regular reception state (NO in step S108), the flow proceeds to the process of step S118. In a case where it is determined that the operation state of the terminal device 20 is a DRX state (YES in step S108), the flow proceeds to the process of step S110.

(Step S110) The scheduling processing unit 164 can estimate that the reception period of time indicated by each candidate DRX setting of which the terminal device is notified is repeated for each DRX period using the start time of DRX estimated in step S106 as a starting point (for example, slot 0 in FIGS. 4 and 10). The scheduling processing unit 164 determines a transmission period of time in which the transmission data is transmitted based on the estimated reception period of time. The transmission period of time is determined in further consideration of a period of time from the transmission of the transmission data to the transmission of response information with respect to the transmission data as described above. In the example shown in FIG. 6, the transmission period of time is equivalent to a period of time obtained by adding a reception period of time for each DRX period to at least one slot within the period of time. More specifically, slots 11 to 14 and 20 to 23 shown in FIG. 6 are equivalent to this transmission period of time. Therefore, the transmission period of time may also include an interval which is outside a reception period of time indicated by a DRX setting. The scheduling processing unit 164 determines whether the current point in time (slot) is within the determined transmission period of time. In a case that it is determined that the current point in time is within the transmission period of time (YES in step S110), the flow proceeds to the process of step S112. In a case that it is determined that the current point in time is outside the transmission period of time (NO in step S110), the flow proceeds to the process of step S114. Meanwhile, in a case where it can be determined that the current point in time is within a transmission period of time corresponding to a reception period of time indicated by a DRX setting already determined not to be a DRX setting which is used in the terminal device 20 (for example, in slots 30 to 33 of FIG. 6, the short period DRX setting is already determined not to be used), the scheduling processing unit 164 may determine that the current point in time is outside the transmission period of time even in a case where the current point in time is within the transmission period of time corresponding to a reception period of time indicated by the DRX setting, and avoid transmission at the current point in time.

(Step S112) The scheduling processing unit 164 transmits at least a portion of user data and scheduling information as transmission data to the terminal device 20 at a slot at the current point in time. Thereafter, the flow proceeds to the process of step S114.

(Step S114) The scheduling processing unit 164 determines whether response information with respect to the transmitted transmission data has been received in a predetermined timing from the time of transmission. In a case that the response information has been received (YES in step S114), the flow proceeds to the process of step S116. In a case that the response information has not been received (NO in step S114), the flow returns to the process of step S110.

(Step S116) The scheduling processing unit 164 continues a process of transmitting the scheduling information and the user data which is not yet transmitted as transmission data to the terminal device 20. Thereafter, the processes shown in FIG. 13 are terminated.

(Step S118) The scheduling processing unit 164 transmits the scheduling information and the acquired user data as transmission data to the terminal device 20. Thereafter, the processes shown in FIG. 13 are terminated.

(Reception Process)

Next, an example of processes performed by the terminal device 20 according to the present embodiment will be described.

Figure 14:
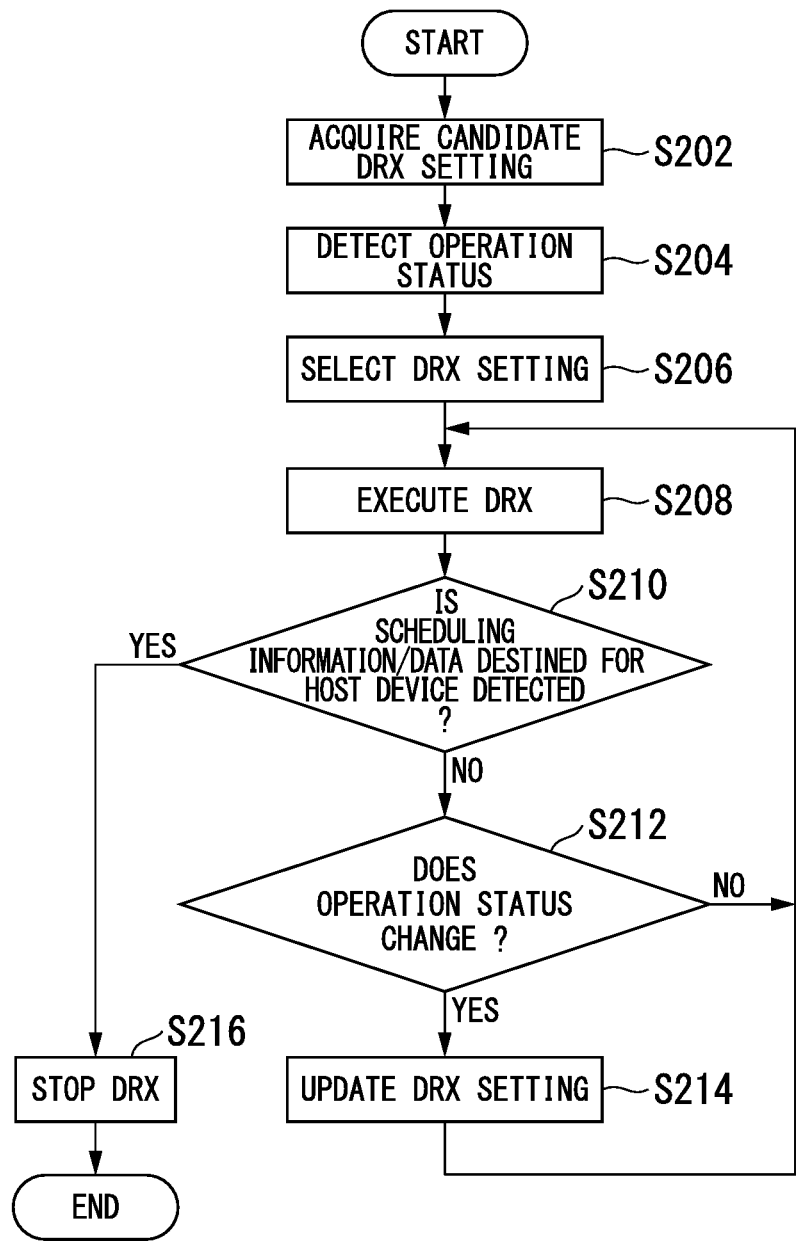
FIG. 14 is a flow chart illustrating an example of processes of the terminal device according to the first embodiment.

FIG. 14 is a flow chart illustrating an example of processes performed by the terminal device 20 according to the present embodiment.

(Step S202) The candidate DRX setting acquisition unit 262 of the terminal device 20 acquires a plurality of candidate DRX settings from the base station device 10, and stores the results in the candidate DRX setting storage unit 282. Thereafter, the flow proceeds to the process of step S204.

(Step S204) The status acquisition unit 266 detects the operation status of a host device by executing the above-described method. Thereafter, the flow proceeds to the process of step S206.

(Step S206) The DRX setting unit 268 selects a candidate DRX setting corresponding to the detected operation status from the candidate DRX stored in the candidate DRX setting storage unit 282. Thereafter, the flow proceeds to the process of step S208.

(Step S208) The control unit 26 executes DRX based on the selected candidate DRX setting. More specifically, the control unit 26 can receive various types of data from the base station device 10 in a reception period of time indicated by the candidate DRX setting for each DRX period indicated by the selected candidate DRX setting. Thereafter, the flow proceeds to the process of step S210.

(Step S210) The control unit 26 attempts to detect the transmission data (scheduling information and user data) destined for the host device in the reception period of time. In a case that the transmission data destined for the host device is normally detected (YES in step S210), the flow proceeds to the process of step S216. In a case that the transmission data destined for the host device is not normally detected, the flow proceeds to the process of step S212.

(Step S212) In a case that an operation status which is detected by the status acquisition unit 266 changes (YES in step S212), the flow proceeds to the process of step S214. In a case that the operation status does not change (NO in step S212), the flow proceeds to the process of step S208.

(Step S214) The DRX setting unit 268 selects (updates) a candidate DRX setting corresponding to the changed operation status. Thereafter, the flow proceeds to the process of step S208.

(Step S216) The control unit 26 stops DRX, generates response information with respect to the normally detected transmission data, and transmits the generated response information to the base station device 10 at a predetermined timing. The control unit 26 starts regular reception. Thereafter, the processes shown in FIG. 14 are terminated.

Meanwhile, the above-described processes mainly exemplify the case of C-DRX, but can also be applied to I-DRX. For example, paging information may be applied as transmission data instead of the scheduling information and the user data in C-DRX. In addition, a preamble signal may be applied as transmission data instead of the ACK/NACK information in C-DRX.

The preamble signal is transmitted through, for example, a physical random access channel (PRACH).

As described above, the base station device 10 according to the present embodiment includes the communication unit (transmission and reception unit 12) that wirelessly communicates with the terminal device 20, and the control unit 16. The control unit 16 notifies the terminal device 20 of discontinuous reception information indicating candidates of a plurality of discontinuous reception settings, and transmits the transmission data to the terminal device 20 in at least a portion of a reception period of time indicated by each of the candidates of a plurality of discontinuous reception settings.

In a case that the response information with respect to the transmission data is received from the terminal device 20, the transmission of the transmission data to the terminal device 20 is continued.

In addition, the terminal device 20 includes the communication unit (transmission and reception unit 22) that wirelessly communicates with the base station device 10, and the control unit 26. The control unit 26 acquires operation status information indicating the operation status of the host device, and makes one discontinuous reception setting based on the operation status information from the candidates of a plurality of discontinuous reception settings indicated by the discontinuous reception information received from the base station device 10. In addition, in a case that the transmission data from the base station device 10 is received in a reception period of time indicated by the set discontinuous reception setting, the control unit 26 transmits the response information with respect to the transmission data to the base station device 10.

Meanwhile, the candidate of an individual discontinuous reception setting indicates a discontinuous reception period and a reception period of time within the discontinuous reception period. In the present embodiment, a plurality of discontinuous reception settings are transmitted and received as the discontinuous reception information.

According to this configuration, the terminal device 20 can select one candidate of a discontinuous reception setting in accordance with the operation status of the host device from the candidates of a plurality of discontinuous reception settings of which the terminal device is notified, and use the selected candidate of a discontinuous reception setting in discontinuous reception. The base station device 10 continues to transmit the transmission data in accordance with the reception of the response information from the terminal device 20, and thus is not required to be notified of the candidate of a discontinuous reception setting selected in the terminal device 20. Therefore, it is possible to suppress an increase in the load of the amount of processing in the base station device 10 while a discontinuous reception setting having a high degree of freedom in the terminal device 20 can be selected.

In addition, the control unit 16 of the base station device 10 may transmit the transmission data to the terminal device 20 in a transmission period of time from an initial transmission slot in a reception period of time indicated by each of the candidates of discontinuous reception settings to a transmission slot after a predetermined slot, and continue to transmit the transmission data in a case that response information with respect to the transmission data at the transmission slot is received at a reception slot after a predetermined slot from the transmission slot.

According to this configuration, the terminal device 20 can transmit response information with respect to a transmission slot to the base station device 10 after a predetermined slot from a slot at which the transmission data is received in the reception period of time of discontinuous reception, and transmit the transmission data without delay from the base station device 10 to the terminal device 20 in a case that discontinuous reception is stopped.

In addition, the control unit 16 of the base station device 10 may transmit the transmission data to the terminal device 20 at an initial transmission slot in a reception period of time indicated by each of the candidates of discontinuous reception settings, and receive response information with respect to the transmission data at a common slot with respect to the transmission slot.

According to this configuration, in a case that the terminal device 20 transmits response information with respect to the transmission data to the base station device 10 at a common slot with respect to a slot at which the transmission data is received in the reception period of time of discontinuous reception, the control unit 16 of the base station device 10 can recognize that a slot at which the transmission data is transmitted is within the reception period of time of discontinuous reception in the terminal device 20. Therefore, the control unit 16 of the base station device 10 can start to transmit the transmission data to the terminal device 20 after a predetermined slot from the transmission slot at which the transmission data is transmitted. In addition, the terminal device 20 can stop discontinuous reception in accordance with the reception of the transmission data, and receive the remaining transmission data which is transmitted by the base station device 10 after a predetermined slot from the reception of the transmission data. In addition, since the amount of information of the transmission data which is transmitted for each of the candidates of discontinuous reception settings can be limited one slot, it is possible to reduce the amount of information of transmission data that cannot be received due to arrival outside the reception period of time of the terminal device 20, and to suppress a decrease in the efficiency of utilization of communication resources as a result.

In addition, the control unit 16 of the base station device 10 may transmit indication information to the terminal device at an initial transmission slot in a reception period of time indicated by each of the candidates of discontinuous reception settings, and receive confirmation information for the indication information at a common slot with respect to the transmission slot. Here, the indication information is information indicating the presence of transmission data which is transmitted to the terminal device 20 after a predetermined slot from the slot.

According to this configuration, in a case that the control unit 26 of the terminal device 20 transmits confirmation information for indication information to the base station device 10 at a common slot with respect to the slot at which the indication information is received in the reception period of time of discontinuous reception, the control unit 16 of the base station device 10 can recognize that a slot at which the confirmation information is received is within the reception period of time of discontinuous reception in the terminal device 20. Therefore, the control unit 16 of the base station device 10 can start to transmit the transmission data to the terminal device 20 after a predetermined slot from the transmission slot of the indication information. In addition, the terminal device 20 can stop discontinuous reception in accordance with the reception of the confirmation information, and receive the transmission data which is transmitted by the base station device 10 after a predetermined slot from the reception of the confirmation information. Since the amount of information of the confirmation information transmitted all at once is remarkably smaller than the amount of information of the transmission data, it is possible to suppress a decrease in a decrease in the efficiency of utilization of communication resource as a result.

Second Embodiment

Next, a second embodiment of the present invention will be described.

First, a communication system S2 which is an example of a communication system according to the present embodiment will be described. The following description is mainly based on differences with the first embodiment. The same components or processes as those in the above-described embodiment are denoted by the same reference numerals and signs, and the description thereof will be quoted unless otherwise noted.

Figure 15:
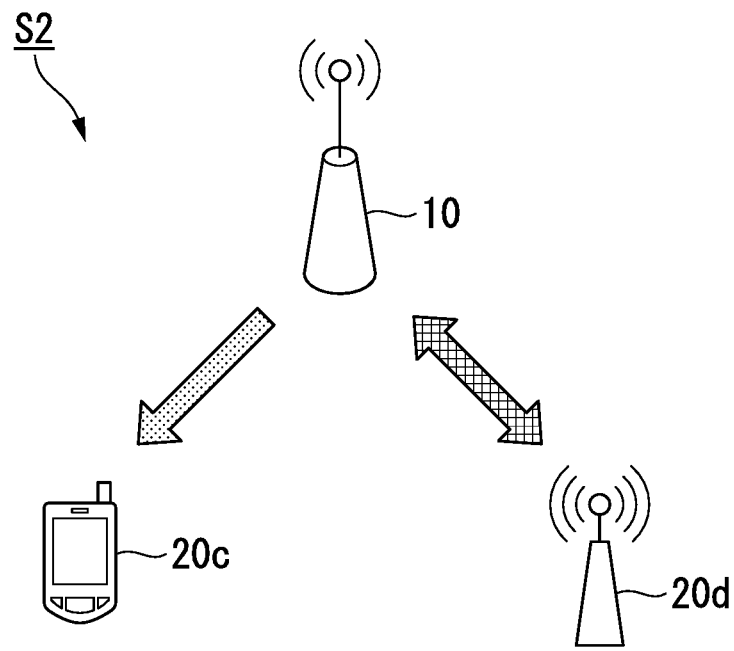
FIG. 15 is a diagram illustrating an example of a communication system according to a second embodiment.

FIG. 15 is a diagram illustrating an example of a communication system S2 according to the present embodiment.

The communication system S2 according to the present embodiment is constituted by more various types of terminal devices 20. In the example shown in FIG. 15, the communication system S2 is configured to include a base station device 10 and terminal devices 20c and 20d. The terminal device 20c is a multifunctional cellular phone (including a so-called smartphone). The terminal device 20d is a wireless router. The terminal device 20d relays, for example, communication between a broadband wireless communication network of a system specified by LTE, 5G or the like and a wireless local area network (LAN) of a system specified by IEEE802.11. The terminal device 20c has a high necessity to save power consumption since it is used mainly while moving. On the other hand, the terminal device 20d is fixed to a predetermined position, and has a relatively low necessity to save power consumption since it can receive electric power from a power supply at all times. Consequently, the base station device 10 according to the present embodiment transmits a plurality of candidate DRXs corresponding to the type of each of the terminal devices 20c and 20d.

(Base Station Device)

Next, a configuration example of the base station device 10 according to the present embodiment will be described.

Figure 16:
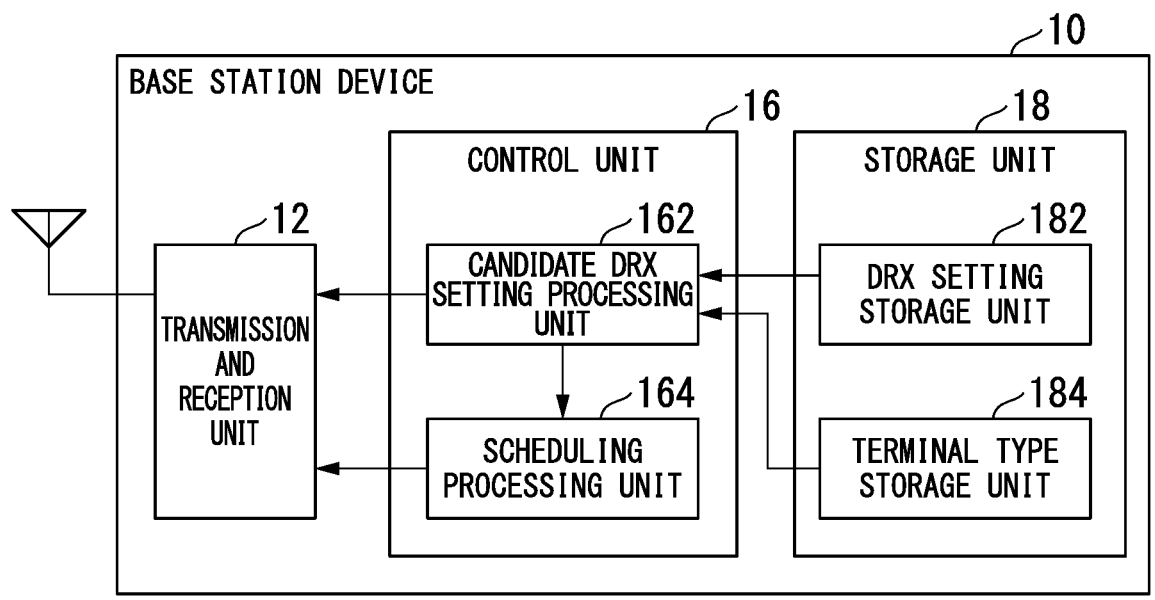
FIG. 16 is a block diagram illustrating a configuration example of a base station device according to the second embodiment.

FIG. 16 is a block diagram illustrating a configuration example of the base station device 10 according to the present embodiment.

The base station device 10 is configured to include a transmission and reception unit 12, a control unit 16, and a storage unit 18. The control unit 16 is configured to include a candidate DRX setting processing unit 162 and a scheduling processing unit 164. The storage unit 18 is configured to include a DRX setting storage unit 182 and a terminal type storage unit 184.

The terminal type storage unit 184 of the base station device 10 receives terminal type information indicating a terminal type from the terminal device 20, and stores the received terminal type information in advance. The terminal type means the type of terminal. The control unit 26 of the terminal device 20 transmits the terminal type information with the information included in UE capability, for example, at a point in time of the registration of a position with the base station device 10, the start of connection with the base station device 10, or the like.

The DRX setting storage unit 182 has a plurality of candidate DRX settings stored therein for each terminal type.

The terminal type is information indicating whether being able to be connected to a power supply in a wired manner, the degree to which immediacy is required in the reception of data, the versatility of application, or the like. The length of a DRX period indicated by a candidate DRX setting or the distribution of a plurality of DRX periods may differ depending on this terminal type. In addition, regular reception setting information indicating regular reception without performing DRX may be stored as a candidate DRX setting, instead of candidate DRX, depending on the terminal type.

The candidate DRX setting processing unit 162 reads out the terminal type information terminal from the type storage unit 184, and transmits a plurality of candidate DRX settings corresponding to the terminal type indicated by the read-out terminal type information to the terminal device 20 using a control channel. Therefore, the candidate DRX setting acquisition unit 262 of the terminal device 20 stores the plurality of candidate DRX settings received using the control channel, as they are, in the candidate DRX setting storage unit 282.

The candidate DRX setting processing unit 162 of the base station device 10 outputs a plurality of candidate DRX settings corresponding to the terminal type indicated by the read-out terminal type information to the scheduling processing unit 164.

The candidate DRX setting processing unit 162 may read out all of a plurality of candidate DRX settings for each terminal type from the terminal type storage unit 184, and transmit all the read-out candidate DRX settings to the terminal device 20 using a broadcast control channel. The candidate DRX setting acquisition unit 262 of the terminal device 20 selects a plurality of candidate DRX settings corresponding to the terminal type of host device among all the candidate DRX settings received using the broadcast control channel, and stores the selected plurality of candidate DRX settings in the candidate DRX setting storage unit 282. However, the candidate DRX setting processing unit 162 reads out the terminal type information from the terminal type storage unit 184, and outputs a plurality of candidate DRX settings corresponding to the terminal type indicated by the read-out terminal type information to the scheduling processing unit 164.

In a case where the regular reception setting information corresponding to the terminal type indicated by the terminal type information read out from the terminal type storage unit 184 is present, and another candidate DRX setting is not present, the candidate DRX setting processing unit 162 may not transmit the candidate DRX setting to the terminal device 20. This is because such a terminal device 20 does not execute DRX.

Meanwhile, the DRX setting unit 268 of the terminal device 20 selects one candidate DRX setting from the stored plurality of candidate DRX settings as described above. In a case where the DRX setting unit 268 selects the regular reception setting information, the control unit 26 continues regular reception without starting DRX even in a case that the DRX timer expires.

(Relationship between Terminal Type and Candidate DRX Setting)

Figures 17, 18:
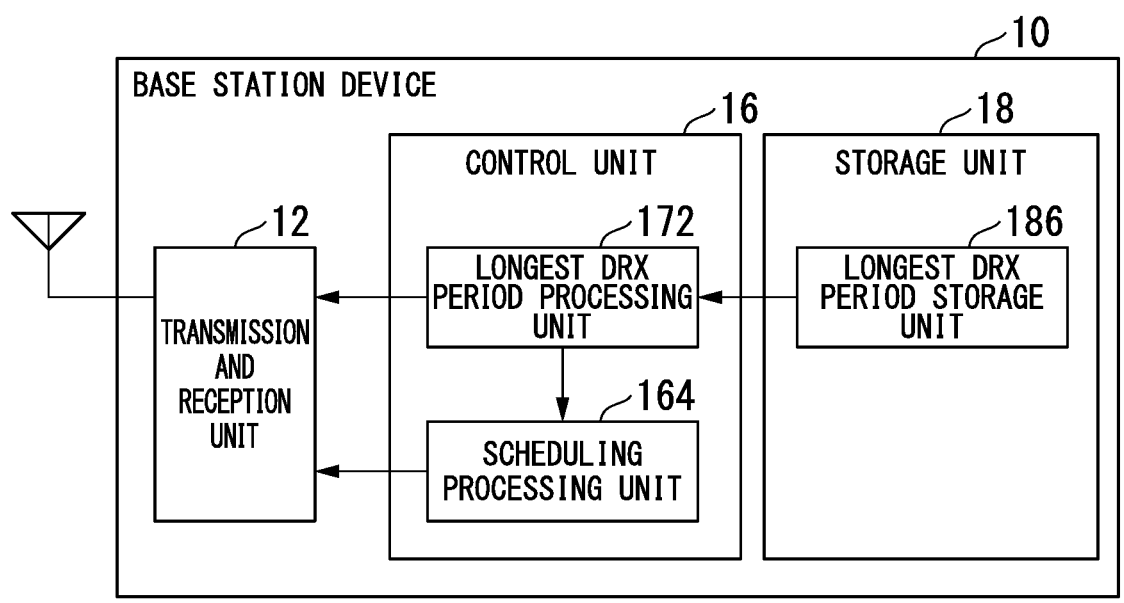
FIG. 17 is a diagram illustrating an example of a terminal type and a candidate DRX setting according to the second embodiment.
FIG. 18 is a block diagram illustrating a configuration example of a base station device according to a third embodiment.

FIG. 17 is a diagram illustrating an example of a terminal type and a candidate DRX setting according to the present embodiment.

Examples of the terminal type include a mobile type, a fixed/regular power supply connection type, an Internet of things (IoT) type, and the like. The terminal device of a mobile type is a terminal device having various applications which is assumed to be used in a state of not being connected to a power supply. An example of the terminal device of a mobile type includes a multifunctional cellular phone (so-called smartphone). In the mobile type, the short period DRX setting, the intermediate period DRX setting, and the long period DRX setting are all associated with each other. However, in the example shown in FIG. 17, it is assumed that a reception period of time for each DRX period is common between a plurality of DRX candidate settings (excluding regular ON).

The terminal device of a fixed/regular power supply connection type is a terminal device of which the position is fixed in a normal use state or which is connected to a power supply in wired manner at all times. An example of the terminal device of a fixed/regular power supply connection type includes a wireless router. The wireless router can be connected to other terminal devices having various applications such as a terminal device that performs high-capacity communication thereunder, a terminal device of an ultra-low delay type, or a terminal device of an IoT type. In the fixed/regular power supply connection type, the short period DRX and the regular reception (regular ON) are associated with each other. In addition, the reason to associate the short period DRX and the regular reception with each other is that the necessity of power saving is relatively low because of being connected to a power supply at all times. In addition, the reason to associate the regular reception is that it is necessary to be connected to a terminal device that executes communication of ultra-low delay, or to exhibit the capability of the terminal device in a case that the regular reception is performed without performing DRX in accordance with the operation status of the terminal device.

The terminal device of an ultra-low delay type is a terminal device that executes communication of ultra-low delay or a terminal device having its function. An example of the terminal device of an ultra-low delay type includes a monitoring device of tele-surgery or the like. The reason to associate only the regular reception in the ultra-low delay type is that it is possible to avoid the execution of DRX and to receive reception data without delay at all times.

The terminal device of an IoT type is a communication device which is included in objects other than an information device such as a communication device or a personal computer, for example, measuring instruments, electrical home appliances or the like, and which does not have a member for connection to a power supply. In the IoT type, the long period DRX setting and the ultra-long period DRX setting are associated with each other. This is because such a terminal device has a relatively high necessity of power saving. In addition, the terminal device 20 is notified of the long period DRX setting and the ultra-long period DRX setting, and thus any of them can be selected. The ultra-long period DRX setting is a DRX setting having a DRX period longer than the DRX period of the long period DRX setting. The DRX period indicated by the ultra-long period DRX setting is, for example, 10 s to a day.

The IoT type may be classified into sub-types which are further subdivided. The candidate DRX setting storage unit 282 of the terminal device 20 may have a candidate DRX setting (for example, long period DRX setting) corresponding to the sub-type of host device stored therein. The candidate DRX setting storage unit 282 may select a candidate DRX setting corresponding to the sub-type of host device from a plurality of candidate DRX settings of which the terminal device is notified.

In this manner, regarding the terminal device of a terminal type having a higher necessity of power saving, a candidate DRX having a longer DRX period with respect to a reception period of time may be associated. In addition, regarding the terminal device of a terminal type requiring more immediacy in the transmission and reception of data, candidate DRX having a shorter DRX period may be associated. In addition, regarding the terminal device of a terminal type having a wider application, candidate DRX having more diverse DRX periods may be associated.

As described above, the base station device 10 according to the present embodiment includes the storage unit (storage unit 18) that stores candidates of a plurality of discontinuous reception settings for each terminal type in association with each other. The candidate DRX setting processing unit 162 selects a candidate of a discontinuous reception setting corresponding to a terminal type reported from the terminal device 20 among the candidates of a plurality of discontinuous reception settings stored in the storage unit, and notifies the terminal device 20 of discontinuous reception information indicating the selected candidate.

According to this configuration, the number of candidates of discontinuous reception settings which are not applied to discontinuous reception in the terminal device 20 can be further reduced than in a case where candidates of discontinuous reception settings according to any type of terminal device 20 are provided. Therefore, the amount of information related to discontinuous reception is reduced, thereby allowing the operational efficiency of the entire communication system to be improved.

Third Embodiment

Next, a third embodiment of the present invention will be described. The following description is mainly based on differences with the first embodiment. The same components or processes as those in the above-described embodiment are denoted by the same reference numerals and signs, and the description thereof will be quoted unless otherwise noted.

A base station device 10 according to the present embodiment transmits a longest DRX period to the terminal device 20, as DRX information indicating a plurality of candidate DRXs, instead of the candidate DRX. The longest DRX period is an upper limit of a DRX period for allowing the terminal device 20 to perform execution. That is, it means the maximum value of a DRX period applied to DRX among DRX periods of a plurality of candidate DRX settings which are set in the terminal device 20 in advance.

FIG. 18 is a block diagram illustrating a configuration example of the base station device 10 according to the present embodiment.

The base station device 10 includes a transmission and reception unit 12, a control unit 16, and a storage unit 18. The control unit 16 is configured to include a scheduling processing unit 164 and a longest DRX period processing unit 172. The storage unit 18 is configured to include a longest DRX period storage unit 186.

The longest DRX period processing unit 172 selects one longest DRX period from a plurality of longest DRX periods which are stored in the longest DRX period storage unit 186 in advance.

The longest DRX period processing unit 172 may select a longest DRX period in accordance with a predetermined reference, and may select a longest DRX period indicated in accordance with a user's operation. The longest DRX period processing unit 172 reads out the selected plurality of longest DRX periods from the longest DRX period storage unit 186. The longest DRX period processing unit 172 transmits the read-out longest DRX period to the terminal device 20 through the transmission and reception unit 12, and outputs the period to the scheduling processing unit 164.

The longest DRX period processing unit 172 transmits the longest DRX period to the terminal device 20 with the period included in communication parameter, for example, during the start of communication connection with the terminal device 20. During the transmission thereof to the terminal device 20, the longest DRX period processing unit 172 delivers the read-out longest DRX period to, for example, one or both of a broadcast control channel and a control channel.

The longest DRX period storage unit 186 has a plurality of different longest DRX periods stored therein in advance.

Meanwhile, the number of longest DRX periods which are stored in the longest DRX period storage unit 186 in advance may be one. The longest DRX period processing unit 172 may read out one longest DRX period which is stored in the longest DRX period storage unit 186, and transmit the read-out longest DRX setting, as it is, to the terminal device 20 through the transmission and reception unit 12 without selecting the setting.

The longest DRX period is input to the scheduling processing unit 164 from the longest DRX period processing unit 172. In a case that the transmission data destined for the terminal device 20 is acquired, the scheduling processing unit 164 repeatedly transmits the transmission data from the next slot. For example, in a case where the scheduling method of m=3 shown in FIG. 5 is used, the scheduling processing unit 164 may repeatedly transmit data with data 0, 1, 2, 3, 0, 1, 2, 3, . . . and a period of m+1 slots. Duplicate transmission is performed on transmission data of 0, 1, 2, 3 which is equivalent to second and subsequent m+1 slots. Similarly to the first and second embodiments, in a case that response information with respect to the transmitted transmission data is received from the terminal device 20 through the transmission and reception unit 12, the scheduling processing unit 164 stops duplicate transmission, and continues to transmit transmission data which is not yet transmitted to the terminal device 20. This is because it is estimated at this time that the terminal device 20 receives the transmission data, and performs regular reception by releasing DRX.

(Terminal Device)

Next, a configuration example of the terminal device 20 according to the present embodiment will be described.

Figure 19:
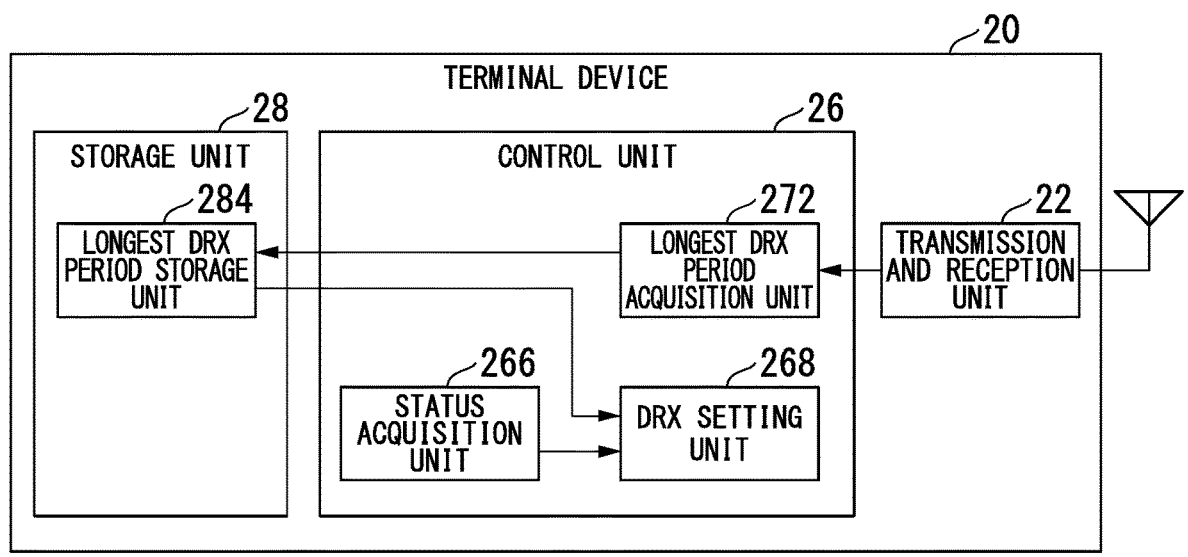
FIG. 19 is a block diagram illustrating a configuration example of a terminal device according to the third embodiment.

FIG. 19 is a block diagram illustrating a configuration example of the terminal device 20 according to the present embodiment.

The terminal device 20 is configured to include a transmission and reception unit 22, a control unit 26, and a storage unit 28.

The control unit 26 is configured to include a status acquisition unit 266, a DRX setting unit 268, and a longest DRX period acquisition unit 272. The storage unit 28 is configured to include a longest DRX period storage unit 284.

The longest DRX period acquisition unit 272 receives the longest DRX period transmitted from the base station device 10. The longest DRX period acquisition unit 272 receives communication parameters from the base station device 10, for example, during communication start connection with the base station device 10, and extracts a longest DRX period from the received communication parameters. A candidate DRX setting selected using a method to be described later based on the longest DRX period acquired at this point in time is used in C-DRX. Meanwhile, in a case where the operation state of the host device (terminal device 20) is a C-DRX state, the longest DRX period acquisition unit 272 may monitor a control channel, and detect a longest DRX period which is delivered through the monitored control channel. In a case where the operation state of the host device is an I-DRX, the longest DRX period acquisition unit 272 receives a broadcast control channel, and detects a longest DRX period which is delivered through the received broadcast control channel. The longest DRX period acquisition unit 272 stores the acquired longest DRX period in the longest DRX period storage unit 284.

Meanwhile, the longest DRX period can be repeatedly transmitted from the base station device 10, but the longest DRX period acquisition unit 272 may update the longest DRX period stored in the longest DRX period storage unit 284 to the latest longest DRX period. Even in a case where the operation state of the host device is a regular reception state, the longest DRX period acquisition unit 272 may receive a longest DRX period.

The longest DRX period storage unit 284 stores the longest DRX period acquired by the longest DRX period acquisition unit 272. In addition, in the longest DRX period storage unit 284, a plurality of candidate DRX settings within the longest DRX period may be arbitrarily set in advance by the control unit 26, and the set candidate DRX setting may be stored in advance.

Meanwhile, the DRX setting unit 268 sets a DRX setting within the longest DRX period stored in the longest DRX period storage unit 284 in advance, in accordance with an operation status indicated by the operation status information which is input from the status acquisition unit 266. In a case where a plurality of candidate DRX settings are stored in the longest DRX period storage unit 186 in advance, the DRX setting unit 268 selects one corresponding candidate DRX setting using the above-described method in accordance with the operation status.

(Transmission Process)

Next, an example of a transmission process performed by the base station device 10 according to the present embodiment will be described.

Figure 20:
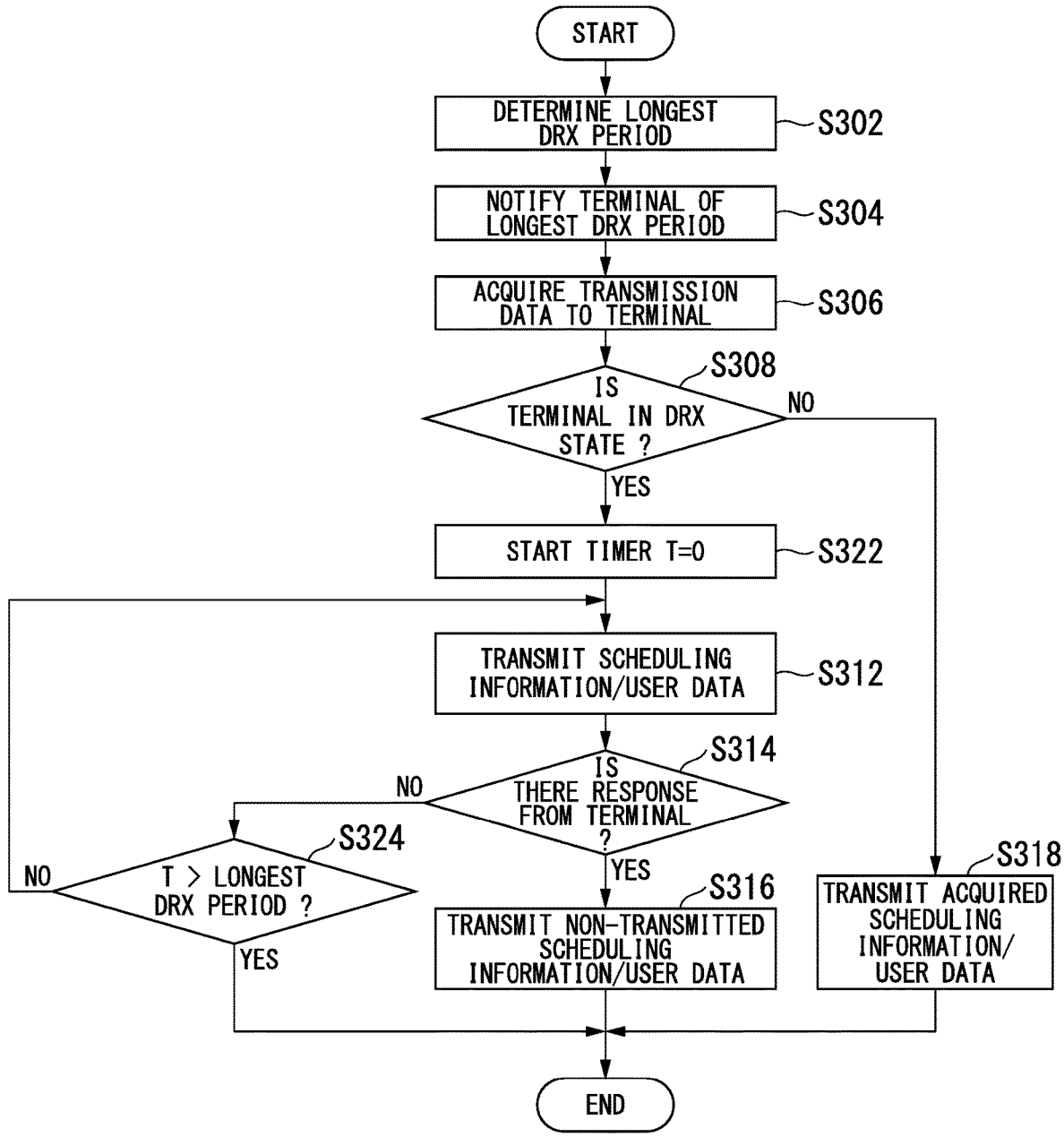
FIG. 20 is a flow chart illustrating an example of processes of the base station device according to the third embodiment.

FIG. 20 is a flow chart illustrating an example of a transmission process according to the present embodiment.

In the process shown in FIG. 20, it is assumed that the control unit 26 of the terminal device 20 transmits response information with respect to transmission data from the base station device 10 at a common slot with respect to a slot at which the transmission data is received (see FIG. 8). In addition, in a case where there is no response information from a terminal for the period of time of one slot, it is assumed that the scheduling processing unit 164 of the base station device 10 determines the terminal to be in a DRX state.

In addition, since the processes of steps S306, S308, S312, S316, and S318 are the same as the processes of steps S106, S108, S112, S116, and S118 (FIG. 13), respectively, the descriptions thereof will be quoted.

(Step S302) The longest DRX period processing unit 172 of the base station device 10 determines a longest DRX period of which the terminal device 20 is notified from the longest DRX period stored in the longest DRX period storage unit 186 in advance. Thereafter, the flow proceeds to the process of step S304.

(Step S304) The longest DRX period processing unit 172 notifies the terminal device 20 of the determined longest DRX period. Thereafter, the flow proceeds to the process of step S306.

In step S308, in a case that the scheduling processing unit 164 determines that the operation state of the terminal device 20 is a DRX state (YES in step S308), the flow proceeds to the process of step S322.

(Step S322) The scheduling processing unit 164 resets time T to the initial value 0, and causes a duplicate transmission timer to start clocking of time T. Thereafter, the flow proceeds to the process of step S312.

(Step S314) In a case where the scheduling processing unit 164 receives response information with respect to the transmitted transmission data (scheduling information and user data) at a slot of the point in time (YES in step S314), the flow proceeds to the process of step S316. In a case where the scheduling processing unit 164 does not receive response information with respect to the transmitted transmission data at a slot of the point in time (NO in step S314), the flow proceeds to the process of step S324.

(Step S324) In a case that time T exceeds the longest DRX period (YES in step S324), the scheduling processing unit 164 determines that the operation state of the terminal device 20 is a sleep state or non-connection state, and terminates the processes shown in FIG. 20. In a case that time T is equal to or less than the longest DRX period (NO in step S324), a slot which is a process target is advanced to the next slot, and the flow proceeds to the process of step S312.

According to the processes of FIG. 20, duplicate transmission is performed assuming each slot within the longest DRX period given notice of to be the reception period of time of each candidate DRX setting without giving notice of a plurality of candidate DRX settings. Therefore, it is possible to reduce the amount of information of signaling related to a DRX setting. In addition, even in a case where each candidate DRX is unknown in the control unit 16, it is possible to continue to transmit the transmission data in accordance with the reception of response information from the terminal device 20 regardless of a candidate DRX setting used in DRX which is executed by terminal device 20.

(Reception Process)

Next, an example of processes performed by the terminal device 20 according to the present embodiment will be described.

Figure 21:
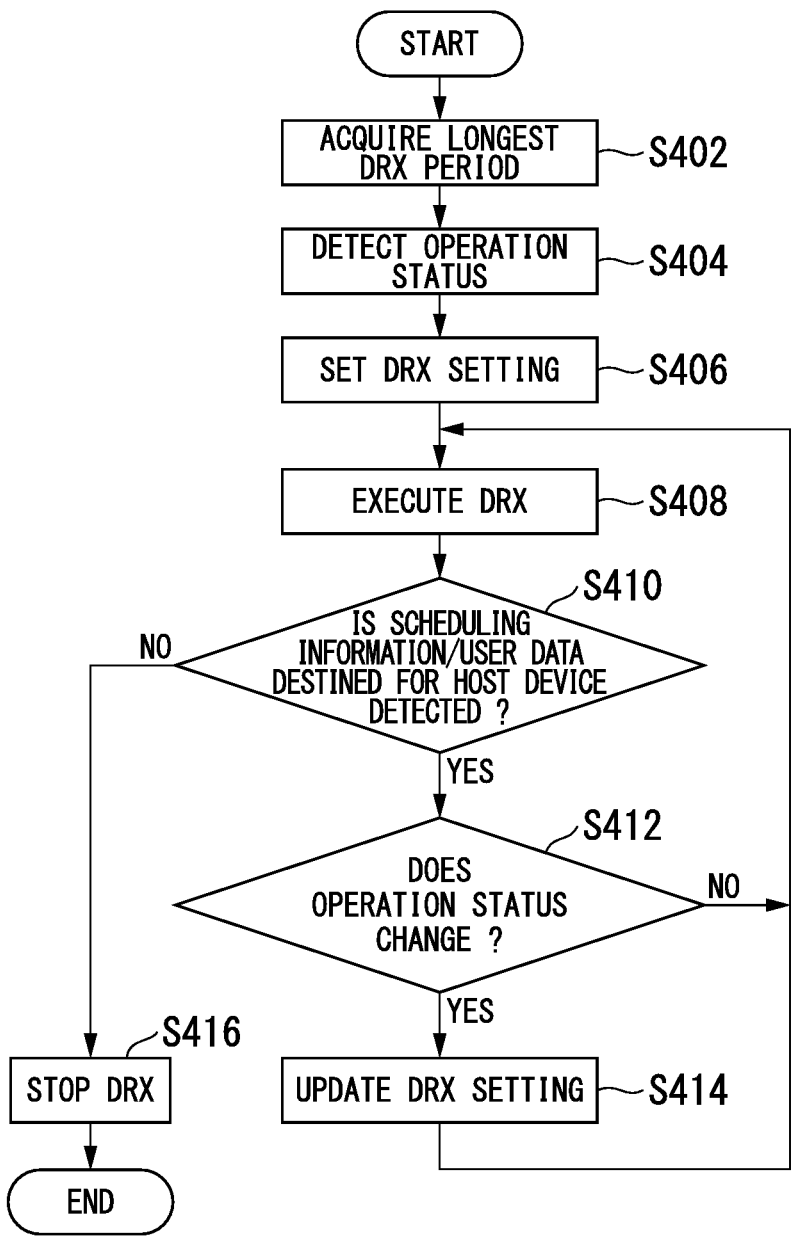
FIG. 21 is a flow chart illustrating an example of processes of the terminal device according to the third embodiment.

FIG. 21 is a flow chart illustrating an example of a reception process according to the present embodiment.

Since the processes of steps S404, S408, S410, S412, and S416 are the same as the processes of steps S204, S208, S210, S212, and S216 (FIG. 14), respectively, the descriptions thereof will be quoted.

(Step S402) The longest DRX period acquisition unit 272 of the terminal device 20 acquires a longest DRX period from the base station device 10, and stores the acquired period in the longest DRX period storage unit 284. Thereafter, the flow proceeds to the process of step S404.

(Step S406) The DRX setting unit 268 sets a DRX setting within the longest DRX period stored in the longest DRX period storage unit 284 in advance in accordance with the operation status in the terminal device 20. In a case where a plurality of candidate DRX settings are stored in the longest DRX period storage unit 186 in advance, the DRX setting unit 268 selects one corresponding candidate DRX setting in accordance with the operation status. Thereafter, the flow proceeds to the process of step S408.

(Step S414) The DRX setting unit 268 sets (updates) DRX within a longest DRX period corresponding to the changed operation status. Thereafter, the flow proceeds to the process of step S408.

Meanwhile, in the processes of FIG. 20, the processes of steps S308 and S318 may be omitted, and even in a case where the operation state of the terminal device 20 is a regular reception state, the flow may proceed to the process of step S322 after the termination of the process of step S306.

The processes of FIG. 20 can also be applied to a case where the control unit of the terminal device 20 transmits the advance indication acknowledgement information gt to the base station device 10 at a common slot with respect to the reception slot of the advance indication information gr in a reception period of time, and receives the transmission data from the base station device 10 at the subsequent slots after n slots from the slot. However, in the process of step S312, the scheduling processing unit 164 of the base station device 10 transmits the advance indication information gr to the terminal device 20.

In the process of step S314, in a case that the advance indication acknowledgement information gt is received as response information from the terminal device 20 (YES in step S314), the flow proceeds to the process of step S316. In step S316, the scheduling processing unit 164 transmits the entire transmission data composed of scheduling information and user data to the terminal device 20 after n slots from the transmission slot of the advance indication information gr. In the process of step S314, in a case that the advance indication acknowledgement information gt is not received as the response information from the terminal device 20 (NO in step S314), the flow proceeds to the process of step S324.

Meanwhile, the processes of FIG. 20 can also be applied to a case where the control unit of the terminal device 20 transmits the response information after m slots from the reception slot of the transmission data in a reception period of time (FIG. 5). However, the scheduling processing unit 164 performs the process of step S314 after m slots from a slot related to the process of step S312, and advances a slot which is a process target in step S312 to the next slot before a time after the m slots arrives. In addition, in step S312, the scheduling processing unit 164 transmits transmission data equivalent to the latest m+1 slots to the terminal device 20. The scheduling processing unit 164 repeats the processes of steps S312 and S314 until time T reaches a time after m slots of the longest DRX period (NO in step S324), and terminates the processes shown in FIG. 20 in a case that time T runs beyond a time after m slots of the longest DRX period (YES in step S324).

In addition, in the process of step S324 in FIG. 20, the scheduling processing unit 164 may compare time T with a period of time (for example, period of time times a (a is a real number greater than 1 which is set in advance)) further extended than the longest DRX period instead of the comparison of time T with the longest DRX period, and determine whether time T has expired beyond the period of time. The scheduling processing unit 164 may retransmit transmission data for a negative acknowledgement from the terminal device 20 to the terminal device 20 in accordance with the reception of the negative acknowledgement. Thereby, in a case where a propagation state between the base station device 10 and the terminal device 20 is inferior, it is possible to more reliably deliver the transmission data to the terminal device 20.

In addition, the storage unit 18 of the base station device 10 further includes the terminal type storage unit 184 (FIG. 16), and the longest DRX period storage unit 186 may store the longest DRX period for each terminal type. Here, regarding the terminal device of a terminal type having a higher necessity of power saving, the longest DRX period for a reception period of time may be made longer. Regarding the terminal device of a terminal type requiring more immediacy in the transmission and reception of data, the longest DRX period may be made shorter. In addition, regarding the terminal device of a terminal type having a wider application, candidate DRX having more diverse DRX periods may be associated.

The longest DRX period processing unit 172 reads out terminal type information from the terminal type storage unit 184, and transmits a longest DRX period corresponding to a terminal type indicated by the read-out terminal type information to the terminal device 20 using a control channel. On the other hand, the longest DRX period acquisition unit 272 of the terminal device 20 stores the longest DRX period received using the control channel in the longest DRX period storage unit 284.

The longest DRX period processing unit 172 reads out all the longest DRX periods for each terminal type from the longest DRX period storage unit 186, and transmits the read-out longest DRX periods to the terminal device 20 using a broadcast control channel. On the other hand, the longest DRX period acquisition unit 272 of the terminal device 20 selects a longest DRX period corresponding to the terminal type of host device among all the longest DRX periods received using the broadcast control channel, and stores the selected longest DRX period in the longest DRX period storage unit 284.

As described above, in the present embodiment, the discontinuous reception information indicating candidates of a plurality of discontinuous reception settings indicates a maximum value (longest DRX period) among discontinuous reception periods indicated by these candidates of a plurality of discontinuous reception settings.

According to this configuration, the control unit 16 of the base station device 10 is not required to perform the transmission of individual discontinuous reception settings and a process related to setting of the transmission time of transmission data in a reception period of time indicated by a discontinuous reception setting. Therefore, it is possible to reduce the load of a process related to the transmission or stop of individual discontinuous reception settings with respect to the terminal device 20. In addition, the control unit 26 of the terminal device 20 can set a reception period of time more flexibly insofar as it is possible to select a discontinuous reception setting according to an operation status, to receive the transmission data from the base station device 10 at at least one slot within the longest DRX period, and to transmit response information with respect to the received transmission data to the base station device 10.

Hereinbefore, the embodiments of this invention have been described with reference to the accompanying drawings, but the specific configurations thereof are not limited to those described above, and various design changes and the like can be made without departing from the scope of this invention.

For example, the number of candidate DRXs which are selected with respect to one terminal device 20 by the candidate DRX setting processing unit 162 (FIG. 2) of the base station device 10 is arbitrary insofar as it is two or more. In addition, the number of candidate DRXs stored in the DRX setting storage unit 182 (FIG. 2) is equal to the number of candidate DRXs selected by the candidate DRX setting processing unit 162, but is arbitrary insofar as the former is larger than the latter.

In addition, the number of candidate DRXs indicating DRX periods equal to or less than the longest DRX period selected by the longest DRX period processing unit 172 among the candidate DRX periods stored in the longest DRX period storage unit 284 (FIG. 19) of the terminal device 20 is arbitrary insofar as it is two or more.

In addition, in the third embodiment, a case is exemplified in which the longest DRX period is applied as the discontinuous reception information indicating candidates of a plurality of discontinuous reception settings, but there is no limitation thereto. A DRX period band may be applied instead of the longest DRX period. The DRX period band means the range of a DRX period to be selected. Information indicating the DRX period band is represented by signs of a small number of bits (for example, 2 to 4 bits) associated with its range, and may be reported from the base station device 10 to the terminal device 20. The range is indicated by the lower limit and the upper limit of a DRX period, and is different from the longest DRX period in that the lower limit is further indicated. The DRX setting unit 268 of the terminal device 20 may select candidate DRX corresponding to an operation status from a candidate DRX setting indicating a DRX period within the range of a DRX period band reported from the base station device 10.

In addition, the DRX period band may be determined in advance for each terminal type. Regarding the terminal device of a terminal type having a higher necessity of power saving, a DRX period band having a longer DRX period with respect to a reception period of time may be associated. In addition, regarding the terminal device of a terminal type requiring more immediacy in the transmission and reception of data, a DRX period band having a shorter DRX period may be associated. In addition, regarding the terminal device of a terminal type having a wider application, a DRX period band having a wider range may be associated.

Meanwhile, each of a portion (for example, control unit 16) of the base station device 10 and a portion (for example, control unit 26) of the terminal device 20 according to the above embodiment may be realized by a computer composed of one or a plurality of processors, a recording medium, an input and output interface, a computer readable recording medium, and the like. In that case, a program for realizing the function of each or the entirety of the control units 16 and 26 may be recorded in each of the storage units 18 and 28, and be realized by causing a computer system to read the recorded program and executing a process indicated by a command described in the read program. Meanwhile, the term "computer system" refers to a computer system built into the base station device 10, and is assumed to include hardware such as an operating system (OS), peripheral devices and the like. The processor may be any of a central processing unit (CPU), a programmable logic device (GPLD) and the like.

In addition, the term "computer readable recording medium" refers to a portable medium such as a flexible disk, a magneto-optic disc, a read only memory (ROM), or a compact disc (CD)(registered trademark)-ROM, and a storage device such as a hard disk which is built into a computer system. Further, the term "computer readable recording medium" may also include recording mediums that dynamically hold a program during a short period of time like networks such as the Internet or communication lines in a case that a program is transmitted through communication lines such as a telephone line, and recording mediums that hold a program for a certain period of time like a volatile memory inside a computer system serving as a server or a client in that case. In addition the above-mentioned program may be a program which is used for realizing a portion of the aforementioned functions, and may be a program which is capable of realizing the aforementioned functions by a combination of programs previously recorded in the computer system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

S1, S2 Communication system
10 Base station device
12 Transmission and reception unit
16 Control unit
18 Storage unit
20 (20a, 20b, 20c, 20d) Terminal device
22 Transmission and reception unit
26 Control unit
28 Storage unit
162 Candidate DRX setting processing unit
164 Scheduling processing unit
172 Longest DRX period processing unit
182 DRX setting storage unit
184 Terminal type storage unit
186 Longest DRX period storage unit
262 Candidate DRX setting acquisition unit
266 Status acquisition unit
268 DRX setting unit
272 Longest DRX period acquisition unit
282 Candidate DRX setting storage unit
284 Longest DRX period storage unit

What is claimed is:

1. A base station device comprising:
a communication unit configured to wirelessly communicate with a terminal device;
a storage unit; and
a control unit, wherein the control unit is configured to
refer to discontinuous reception information, stored in the storage unit, which indicates a plurality of discontinuous reception settings,
transmit transmission data to the terminal device in at least a portion of a first reception period of time corresponding to at least one of the plurality of discontinuous reception settings, the transmission being performed without receiving, from the terminal device, a discontinuous reception setting selected, by the terminal device, from among the plurality of discontinuous reception settings,
continue transmitting the transmission data in the first reception period of time in a case that it is determined that response information with respect to the transmission data transmitted in the at least the portion of the first reception period of time is received,
transmit the transmission data to the terminal device in at least a portion of a second reception period of time corresponding to at least another one of the plurality of discontinuous reception settings in a case that it is determined that the response information with respect to the transmitted transmission data transmitted in the at least the portion of the first reception period of time is not received, and
continue transmitting the transmission data in the second reception period of time in a case that it is determined that response information with respect to the transmitted transmission data transmitted in the at least the portion of the second reception period of time is received.

2. The base station device according to claim 1, wherein the control unit is configured to determine that response information with respect to the transmitted transmission data is not received in a case that response information with respect to the transmission data is not received at a reception slot after a predetermined slot from a transmission slot at which the transmission data is transmitted.

3. The base station device according to claim 1, wherein the control unit is configured to determine that response information with respect to the transmitted transmission data is not received in a case that response information with respect to the transmission data is not received at a common slot with respect to a transmission slot at which the transmission data is transmitted.

4. The base station device according to claim 1, wherein the transmission data is indication information indicating presence of transmission data which is transmitted to the terminal device after a predetermined slot from a transmission slot at which the transmission data is transmitted, and the response information is confirmation information for the indication information.

5. The base station device according to claim 1, wherein the discontinuous reception setting includes a discontinuous reception period and a reception period of time within the discontinuous reception period.

6. The base station device according to claim 1, wherein the discontinuous reception information indicates a maximum value among discontinuous reception periods indicated by the plurality of discontinuous reception settings.

7. The base station device according to claim 1, wherein the control unit is configured to
refer to association of a terminal type with the discontinuous reception setting which is stored in the storage unit,
select the discontinuous reception setting corresponding to a terminal type reported from the terminal device, and
transmit the transmission data to the terminal device in at least a portion of a reception period of time corresponding to the discontinuous reception setting selected.

8. A communication system comprising:
a base station device; and
a terminal device,
wherein the base station device comprises:
a communication unit,
a storage unit, and
a control unit, and
wherein the control unit is configured to
refer to discontinuous reception information, stored in the storage unit, which indicates a plurality of discontinuous reception settings,
transmit transmission data to the terminal device in at least a portion of a first reception period of time corresponding to at least one of the plurality of discontinuous reception settings, the transmission being performed without receiving, from the terminal device, a discontinuous reception setting selected, by the terminal device, from among the plurality of discontinuous reception settings,
continue transmitting the transmission data in the first reception period of time in a case that it is determined that response information with respect to the transmitted transmission data transmitted in the at least the portion of the first reception period of time is received,
transmit the transmission data to the terminal device in at least a portion of a second reception period of time corresponding to at least another one of the plurality of discontinuous reception settings in a case that it is determined that the response information with respect to the transmitted transmission data transmitted in the at least the portion of the first reception period of time is not received, and
continue transmitting the transmission data in the second reception period of time in a case that it is determined that response information with respect to the transmitted transmission data transmitted in the at least the portion of the second reception period of time is received.

9. A communication system comprising:
a base station device; and
a terminal device,
wherein the base station device comprises:
a communication unit,
a storage unit, and
a control unit,
wherein the control unit is configured to notify the terminal device of discontinuous reception information, stored in the storage unit, which indicates a plurality of discontinuous reception settings through the communication unit,
wherein the terminal device comprises:
a terminal communication unit,
a terminal storage unit, and
a terminal control unit, and
wherein the terminal control unit is configured to
store discontinuous reception information received from the base station device through the terminal communication unit in the terminal storage unit,
select one of the plurality of discontinuous reception settings indicated by the discontinuous reception information stored in the terminal storage unit,
receive transmission data from the base station device in at least a portion of a first reception period of time corresponding to at least one of the plurality of discontinuous reception settings, the reception being performed without transmitting, to the base station device, a discontinuous reception setting selected, by the terminal device, from among the plurality of discontinuous reception settings,
continue receiving the transmission data in the first reception period of time in a case that it is determined that response information with respect to the transmitted transmission data received in the at least the portion of the first reception period of time is transmitted,
receive the transmission data from the base station device in at least a portion of a second reception period of time corresponding to at least another one of the plurality of discontinuous reception settings in a case that it is determined that the response information with respect to the transmitted transmission data received in the at least the portion of the first reception period of time is not transmitted, and
continue receiving the transmission data in the second reception period of time in a case that it is determined that response information with respect to the transmitted transmission data received in the at least the portion of the second reception period of time is transmitted.

10. A terminal device comprising:
a communication unit configured to wirelessly communicate with a base station device;
a storage unit; and
a control unit,
wherein the control unit is configured to
select one discontinuous reception setting from among a plurality of discontinuous reception settings indicated by discontinuous reception information stored in the storage unit,
receive transmission data from the base station device in at least a portion of a first reception period of time corresponding to at least one of the plurality of discontinuous reception setting, the reception being performed without transmitting, to the base station device, a discontinuous reception setting selected, by the terminal device, from among the plurality of discontinuous reception settings, and continue receiving the transmission data in the first reception period of time in a case that it is determined that response information with respect to the transmitted transmission data received in the at least the portion of the first reception pod of time is transmitted, receive the transmission data from the base station device in at least a portion of a second reception period of time corresponding to at least another one of the plurality of discontinuous reception settings in a case that it is determined that the response information with respect to the transmitted transmission data received in the at least the portion of the first reception period of time is not transmitted, and continue receiving the transmission data in the second reception period of time in a case that it is determined that response information with respect to the transmitted transmission data received in the at least the portion of the second reception period of time is transmitted.

11. The terminal device according to claim 10, wherein the control unit is configured to store discontinuous reception information received from the base station device in the storage unit.

12. A communication method of a base station device including a communication unit configured to wirelessly communicate with a terminal device and a storage unit, wherein the base station device is configured to refer to discontinuous reception information, stored in the storage unit, which indicates a plurality of discontinuous reception settings, and wherein the communication method comprises:

transmitting transmission data to the terminal device in at least a portion of a first reception period of time corresponding to at least one of the plurality of discontinuous reception settings, the transmission being performed without receiving, from the terminal device, a discontinuous reception setting selected, by the terminal device, from among the plurality of discontinuous reception settings, continue transmitting the transmission data in the first reception period of time in a case that it is determined that response information with respect to the transmitted transmission data transmitted in the at least the portion of the first reception period of time is received, transmitting the transmission data to the terminal device in at least a portion of a second reception period of time corresponding to at least another one of the plurality of discontinuous reception settings in a case that it is determined that the response information with respect to the transmitted transmission data transmitted in the at least the portion of the first reception period of time is not received, and continuing transmitting the transmission data in the second reception period of time in a case that it is determined that response information with respect to the transmitted transmission data transmitted in the at least the portion of the second reception period of time is received.

13. A non-transitory computer readable recording medium storing a program for causing a computer of a base station device including a communication unit configured to wirelessly communicate with a terminal device and a storage unit to:

refer to discontinuous reception information, stored in the storage unit, which indicates a plurality of discontinuous reception settings;

transmit transmission data to the terminal device in at least a portion of a first reception period of time corresponding to at least one of the plurality of discontinuous reception settings, the transmission being performed without receiving, from the terminal device, a discontinuous reception setting selected, by the terminal device, from among the plurality of discontinuous reception settings;

continue transmitting the transmission data in the first reception period of time in a case that it is determined that response information with respect to the transmitted transmission data transmitted in the at least the portion of the first reception period of time is received, transmit the transmission data to the terminal device in at least a portion of a second reception period of time corresponding to at least another one of the plurality of discontinuous reception settings in a case that it is determined that the response information with respect to the transmitted transmission data transmitted in the at least the portion of the first reception period of time is not received, and continue transmitting the transmission data in the second reception period of time in a case that it is determined that response information with respect to the transmitted transmission data transmitted in the at least the portion of the second reception period of time is received.

* * * * *